United States Patent
Chen et al.

(10) Patent No.: US 12,530,884 B2
(45) Date of Patent: Jan. 20, 2026

(54) IMAGE PROCESSING METHOD AND RELATED APPARATUS

(71) Applicant: HUAWEI TECHNOLOGIES CO., LTD., Guangdong (CN)

(72) Inventors: Xinghao Chen, Beijing (CN); Wenshuo Li, Beijing (CN); Yunhe Wang, Beijing (CN); Chunjing Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 294 days.

(21) Appl. No.: 18/455,918

(22) Filed: Aug. 25, 2023

(65) Prior Publication Data

US 2023/0401838 A1    Dec. 14, 2023

Related U.S. Application Data

(63) Continuation of application No. PCT/CN2022/077926, filed on Feb. 25, 2022.

(30) Foreign Application Priority Data

Feb. 27, 2021    (CN) .......................... 202110221928.2

(51) Int. Cl.
*G06V 10/82* (2022.01)
*G06V 10/77* (2022.01)
*G06V 10/80* (2022.01)

(52) U.S. Cl.
CPC .......... *G06V 10/82* (2022.01); *G06V 10/7715* (2022.01); *G06V 10/803* (2022.01)

(58) Field of Classification Search
CPC ... G06V 10/82; G06V 10/7715; G06V 10/803
See application file for complete search history.

(56) References Cited

FOREIGN PATENT DOCUMENTS

| CN | 110969632 A | 4/2020 |
|---|---|---|
| CN | 111476306 A | 7/2020 |
| CN | 111914997 A | 11/2020 |

(Continued)

OTHER PUBLICATIONS

Yunbo Zhang et al, "CSANet: Channel and Spatial Mixed Attention CNN for Pedestrian Detection", 2020, Digital Object Identifier 10.1109/ACCESS.2020.2986476 (10 Pages) (Year: 2020).*

(Continued)

*Primary Examiner* — David F Dunphy

(57) ABSTRACT

An image processing method is disclosed in embodiments of this disclosure and is applied to the field of artificial intelligence. The method includes: obtaining an input feature map of an image to be processed, where the input feature map includes a first input sub-feature map and a second input sub-feature map, and resolution of the first input sub-feature map is higher than resolution of the second input sub-feature map; performing feature fusion processing on the input feature map by using a target network, to obtain an output feature map, where a feature of the first input sub-feature map is fused to a feature of the second input sub-feature map from a low level to a high level in the target network; and performing, based on the output feature map, object detection on the image to be processed, to obtain an object detection result.

20 Claims, 13 Drawing Sheets

(56) References Cited

FOREIGN PATENT DOCUMENTS

| | | | | |
|---|---|---|---|---|
| CN | 202010615537 A | * | 11/2020 | ............. G06N 3/045 |
| CN | 113065575 A | | 7/2021 | |
| WO | 2021018251 A1 | | 2/2021 | |

OTHER PUBLICATIONS

Liang Yi et al:"TFPN: Twin Feature Pyramid Networks for Object Detection." DOI 10.1109/ICTAI2019.00251. Nov. 4, 2019. total 6 pages.
Extended European Search Report issued in EP Application No. 22758970.2 dated May 10, 2024.
Hanting Chen et al: "AdderNet: Do We Really Need Multiplications in Deep Learning?", 2020 IEEE/CVF Conference on Computer Vision and Pattern Recognition (CVPR), Jun. 13-19, 2020, total 10 pages.
Dehua Song et al: "AdderSR: Towards Energy Efficient Image Super-Resolution", 2021 IEEE/CVF Conference on Computer Vision and Pattern Recognition (CVPR), Jun. 2021, total 10 pages.
International Search Report and Written Opinion issued in PCT Application No. PCT/CN2022/077926 dated May 10, 2022.
Chinese Office Action issued in Chinese Application No. 202110221928.2 dated Jan. 9, 2024.

* cited by examiner

Table 1. Ablation studies for AdderDet baseline. "NAN" indicates that the training is non-convergent.

| Unfrozen BN | L1 Gradients | KD pre-trained | Tricks | mAP | $AP_{50}$ | $AP_{75}$ | $AP_S$ | $AP_M$ | $AP_L$ |
|---|---|---|---|---|---|---|---|---|---|
| | | | | NAN | - | - | - | - | - |
| ✓ | | | | 32.4 | 50.3 | 34.2 | 18.2 | 35.8 | 41.5 |
| ✓ | ✓ | | | 32.6 | 50.5 | 34.5 | 18.3 | 35.8 | 42.1 |
| ✓ | ✓ | ✓ | | 33.2 | 51.2 | 35.1 | 18.3 | 36.2 | 42.7 |
| ✓ | ✓ | ✓ | ✓ | 34.8 | 52.6 | 37.1 | 19.7 | 38.4 | 44.5 |

Table 2. Ablation studies for neck structures.

| Neck | Type | mAP | $AP_{50}$ | $AP_{75}$ | $AP_S$ | $AP_M$ | $AP_L$ |
|---|---|---|---|---|---|---|---|
| FPN | Adder | 34.8 | 52.6 | 37.1 | 19.7 | 38.4 | 44.5 |
| PAFPN | Adder | 34.9 (+0.1) | 52.4 | 37.2 | 20.1 | 38.3 | 44.5 |
| PAFPN w/ shortcut | Adder | 36.1 (+1.3) | 53.8 | 38.9 | 20.4 | 39.8 | 46.5 |
| R-PAFPN | Adder | 36.5 (+1.7) | 54.7 | 39.4 | 20.8 | 40.4 | 46.8 |

IMAGE PROCESSING METHOD AND RELATED APPARATUS

CROSS-REFERENCE TO RELATED APPLICATIONS

This application is a continuation of International Application No. PCT/CN2022/077926, filed on Feb. 25, 2022, which claims priority to Chinese Patent Application No. 202110221928.2, filed on Feb. 27, 2021. The disclosures of the aforementioned applications are hereby incorporated by reference in their entireties.

TECHNICAL FIELD

This disclosure relates to the field of artificial intelligence technologies, and in particular, to an image processing method and a related apparatus.

BACKGROUND

Computer vision is an integral part of various intelligent/autonomous systems in various application fields such as manufacturing, inspection, document analysis, medical diagnosis, and military affairs, and is related to knowledge about how to use a camera/video camera and a computer to obtain required data and information of a photographed object. Figuratively, an eye (a camera or video camera) and a brain (an algorithm) are installed to replace human eyes on a computer to identify, track, and measure an object, so that the computer can perceive an environment. Perception may be regarded as extraction of information from a sensory signal. Therefore, the computer vision may also be regarded as a science of studying how to enable an artificial system to "perceive" an image or multi-dimensional data. In general, according to the computer vision, various imaging systems are used to replace visual organs to obtain input information, and then a computer replaces a brain to process and interpret the input information. A final study goal of the computer vision is to enable a computer to observe and understand the world through vision in a way that human beings do, and have a capability of autonomously adapting to an environment.

Object detection, also referred to as object extraction, is image segmentation that is based on geometric and statistical features of an object. The object detection focuses on a specific object in an image, and is required to obtain both category information and location information of the specific object. The object detection is applied to a plurality of scenarios, for example, an uncrewed security system, an intelligent transportation system, an intelligent surveillance system, and the like. The object detection is not difficult for humans. It is easy to locate and classify objects in an image by the perception of modules of different colors in the image. However, an RGB pixel matrix is shown on a computer, and it is difficult to directly obtain an abstract concept of an object and locate the object from an image. In addition, sometimes a plurality of objects are mixed with a cluttered background, which makes the object detection more difficult.

Currently, convolutional neural network-based deep learning has good performance in processing a computer vision task. However, in this type of convolutional neural network, a large quantity of multiplication operations are usually included, resulting in high power consumption of the network. Therefore, an adder neural network in which an addition operation replaces a multiplication operation is proposed in a related technology, to reduce power consumption of network computing. However, the adder neural network in the related technology is mainly applied to the field of technologies such as image classification or image restoration. Currently, it is usually difficult to obtain an effective detection result when the adder neural network is applied to object detection.

SUMMARY

This disclosure provides an image processing method. In a stage of feature fusion, a low-level feature is fused to a high-level feature from a low level to a high level, to compensate for sparseness of the high-level feature, so that object detection precision is improved and a problem that an adder neural network cannot be applied to object detection is solved.

A first aspect of this disclosure provides an image processing method. The method includes: a terminal obtains an input feature map of an image to be processed, where the input feature map includes a first input sub-feature map and a second input sub-feature map, and resolution of the first input sub-feature map is higher than resolution of the second input sub-feature map. The image to be processed is an image on which object detection needs to be performed. The image to be processed may be an image shot by the terminal by using a camera, or the image to be processed may be an image obtained from an interior of the terminal (for example, an image stored in an album of the terminal, or an image obtained by the terminal from a cloud). Correspondingly, the input feature map of the image to be processed may be a feature map of the image. Alternatively, the input feature map may be a feature map obtained after being processed by a backbone network in an object detection network, and the backbone network may be an adder neural network.

The terminal performs feature fusion processing on the input feature map by using a target network, to obtain an output feature map, where the target network is an adder neural network. The target network includes a plurality of branches configured to perform feature fusion processing. The plurality of branches include a first branch and a second branch. The first branch is configured to perform feature extraction processing on the first input sub-feature map, to obtain a first sub-feature map and a first output sub-feature map. The first sub-feature map is an intermediate feature map obtained by the first branch.

The second branch is configured to perform feature extraction processing on the second input sub-feature map and the first sub-feature map, to obtain a second output sub-feature map. The output feature map includes the first output sub-feature map and the second output sub-feature map.

Finally, the terminal performs, based on the output feature map, object detection on the image to be processed, to obtain an object detection result.

In this solution, when the object detection is performed by using the adder neural network, and multi-scale feature fusion is performed, a low-level feature is fused to a high-level feature from a low level to a high level, to compensate for sparseness of the high-level feature, so that object detection precision is improved and a problem that the adder neural network cannot be applied to the object detection is solved.

Optionally, in a possible implementation, feature extraction processing in the target network is an addition operation or a subtraction operation. The addition operation is that:

addition is performed between a feature extraction kernel and an element at a corresponding location in an input image to obtain a target matrix, and after absolute values are taken for elements in the target matrix, the absolute values are summed. The subtraction operation is that: subtraction is performed between a feature extraction kernel and an element at a corresponding location in an input image to obtain a target matrix, and after absolute values are taken for elements in the target matrix, the absolute values are summed. In other words, the target matrix may be obtained by performing matrix addition or matrix subtraction on an input sub-feature map corresponding to the target matrix and the feature extraction kernel.

A function of the feature extraction kernel in image processing is equivalent to a filter for extracting specific information from an input image matrix. The feature extraction kernel may essentially be a weight matrix. In a process of performing a convolution operation on an image, the weight matrix usually processes pixels at a granularity level of one pixel (or two pixels or the like, depending on a value of a stride) in a horizontal direction on an input image, to extract a specific feature from the image.

For example, the feature extraction processing performed by the first branch on the first input sub-feature map may be the foregoing addition operation or subtraction operation. The feature extraction processing performed by the second branch on the second input sub-feature map and the first sub-feature map may also be the foregoing addition operation or subtraction operation.

Optionally, in a possible implementation, that the second branch is configured to perform feature extraction processing on the second input sub-feature map and the first sub-feature map, to obtain a second output sub-feature map includes: the second branch is configured to: add the second input sub-feature map and the first sub-feature map that is obtained after down-sampling processing is performed, to obtain a second sub-feature map, and perform feature extraction processing on the second sub-feature map, to obtain the second output sub-feature map. Resolution of the first sub-feature map obtained through processing by the first branch is higher than resolution of the second input sub-feature map in the second branch. Therefore, down-sampling processing may be performed on the first sub-feature map, so that the resolution of the first sub-feature map is the same as the resolution of the second input sub-feature map. Then, the second input sub-feature map and the first sub-feature map that is obtained after down-sampling processing is performed are added, to obtain the second sub-feature map.

In other words, for the first branch that processes the first input sub-feature map with high resolution, the first branch transfers an intermediate feature obtained by processing the first input sub-feature map to the second branch that processes the second input sub-feature map with low resolution. In other words, a low-level feature is fused to a high-level feature from a low level to a high level, so that sparsity of the high-level feature processed in the second branch is compensated.

Optionally, in a possible implementation, that the second branch performs feature extraction processing on the second sub-feature map includes: the second branch processes the second sub-feature map by using a convolutional layer (for example, an addition filtering layer) and an activation function, to obtain a third sub-feature map, and the convolutional layer may include one or more feature extraction kernels. The second branch adds the second sub-feature map and the third sub-feature map, to obtain the second output sub-feature map.

In this solution, for a defect in an expression capability of an addition feature extraction kernel, a skip connection structure including a convolutional layer and an activation function is designed to enhance an expression capability of a convolutional unit in the target network, so that a feature learning capability of the target network is enhanced.

Optionally, in a possible implementation, the second branch is further configured to perform feature extraction processing on the second sub-feature map, to obtain a fourth sub-feature map. The fourth sub-feature map is an intermediate feature obtained by the second branch. That the first branch performs feature extraction processing on the first input sub-feature map includes: the first branch performs feature extraction processing on the first sub-feature map, to obtain the first sub-feature map; the first branch adds the first sub-feature map and the fourth sub-feature map that is obtained after up-sampling processing is performed, to obtain a fifth sub-feature map; and the first branch performs feature extraction processing on the fifth feature map, to obtain the first output sub-feature map.

In this solution, after a low-level feature is first fused to a high-level feature from a low level to a high level, then a processed high-level feature is fused to the low-level feature, so that rich semantic information is introduced to the low-level feature to improve a feature fusion effect, which improves object detection precision of a network.

Optionally, in a possible implementation, that the first branch performs feature extraction processing on the fifth feature map, to obtain the first output sub-feature map includes: the first branch processes the fifth sub-feature map by using a convolutional layer and an activation function, to obtain a sixth sub-feature map; and the first branch adds the fifth sub-feature map and the sixth sub-feature map, to obtain the first output sub-feature map.

Optionally, in a possible implementation, a gradient of the input feature map is determined based on a difference between a weight of the target network and the input feature map.

Optionally, in a possible implementation, the gradient of the input feature map is obtained by performing a sign fetch operation on the difference between the weight of the target network and the input feature map.

In this solution, based on a characteristic that a plurality of branches and a plurality of loss functions usually exist in an adder neural network, a more accurate gradient is obtained by providing a gradient calculation manner including the sign fetch operation, which is conducive to improving final object detection precision.

A second aspect of this disclosure provides an image processing apparatus. The apparatus includes: an obtaining unit and a processing unit. The obtaining unit is configured to obtain an input feature map of an image to be processed, where the input feature map includes a first input sub-feature map and a second input sub-feature map, and resolution of the first input sub-feature map is higher than resolution of the second input sub-feature map. The processing unit is configured to perform feature fusion processing on the input feature map by using a target network, to obtain an output feature map, where the target network is an adder neural network, the target network includes a first branch and a second branch, the first branch is configured to perform feature extraction processing on the first input sub-feature map, to obtain a first sub-feature map and a first output sub-feature map, the first sub-feature map is an intermediate feature obtained by the first branch, the second branch is configured to perform feature extraction processing on the second input sub-feature map and the first sub-feature map, to obtain a second output sub-feature map, and the output feature map includes the first output sub-feature map and the second output sub-feature map. The processing unit is further configured to perform, based on the output feature map, object detection on the image to be processed, to obtain an object detection result.

Optionally, in a possible implementation, that the second branch is configured to perform feature extraction processing on the second input sub-feature map and the first sub-feature map, to obtain a second output sub-feature map includes: the second branch is configured to: add the second input sub-feature map and the first sub-feature map that is obtained after down-sampling processing is performed, to obtain a second sub-feature map, and perform feature extraction processing on the second sub-feature map, to obtain the second output sub-feature map.

Optionally, in a possible implementation, that the second branch performs feature extraction processing on the second sub-feature map includes: the second branch processes the second sub-feature map by using a convolutional layer and an activation function, to obtain a third sub-feature map; and the second branch adds the second sub-feature map and the third sub-feature map, to obtain the second output sub-feature map.

Optionally, in a possible implementation, the second branch is further configured to perform feature extraction processing on the second sub-feature map, to obtain a fourth sub-feature map. The fourth sub-feature map is an intermediate feature obtained by the second branch. That the first branch performs feature extraction processing on the first input sub-feature map includes: the first branch performs feature extraction processing on the first sub-feature map, to obtain the first sub-feature map; the first branch adds the first sub-feature map and the fourth sub-feature map that is obtained after up-sampling processing is performed, to obtain a fifth sub-feature map; and the first branch performs feature extraction processing on the fifth feature map, to obtain the first output sub-feature map.

Optionally, in a possible implementation, that the first branch performs feature extraction processing on the fifth feature map, to obtain the first output sub-feature map includes: the first branch processes the fifth sub-feature map by using a convolutional layer and an activation function, to obtain a sixth sub-feature map; and the first branch adds the fifth sub-feature map and the sixth sub-feature map, to obtain the first output sub-feature map.

Optionally, in a possible implementation, a gradient of the input feature map is determined based on a difference between a weight of the target network and the input feature map.

Optionally, in a possible implementation, the gradient of the input feature map is obtained by performing a sign fetch operation on the difference between the weight of the target network and the input feature map.

A third aspect of this disclosure provides an image processing apparatus. The apparatus may include a processor. The processor is coupled to a memory, and the memory stores program instructions. When the program instructions stored in the memory are executed by the processor, the method according to the first aspect is performed. For performing, by the processor, steps in the possible implementations of the first aspect, refer to the first aspect. Details are not described herein again.

A fourth aspect of this disclosure provides a computer-readable storage medium. The computer-readable storage medium stores a computer program. When the computer program is run on a computer, the computer is enabled to perform the method according to the first aspect.

A fifth aspect of this disclosure provides a circuit system. The circuit system includes a processing circuit. The processing circuit is configured to perform the method according to the first aspect.

A sixth aspect of this disclosure provides a computer program product. When the computer program product is run on a computer, the computer is enabled to perform the method according to the first aspect.

A seventh aspect of this disclosure provides a chip system. The chip system includes a processor, configured to support a server or a threshold obtaining apparatus in implementing functions in the first aspect, for example, sending or processing data and/or information in the foregoing method. In a possible design, the chip system further includes a memory. The memory is configured to store program instructions and data that are necessary for a server or a communication device. The chip system may include a chip, or may include a chip and another discrete device.

DESCRIPTION OF EMBODIMENTS

The following describes embodiments of the present invention with reference to the accompanying drawings in embodiments of the present invention. Terms used in embodiments of the present invention are merely intended to explain specific embodiments of the present invention, and are not intended to limit the present invention.

The following describes embodiments of this disclosure with reference to accompanying drawings. A person of ordinary skill in the art may learn that, with technology development and emergence of a new scenario, the technical solutions provided in embodiments of this disclosure are also applicable to a similar technical problem.

In the specification, the claims, and the accompanying drawings of this disclosure, the terms "first", "second", and the like are intended to distinguish between similar objects but do not necessarily indicate a specific order or sequence. It should be understood that the terms used in such a way are interchangeable in proper circumstances, and this is merely a discrimination manner for describing objects having a same attribute in embodiments of this disclosure. In addition, the terms "include", "have", and any other variants thereof mean to cover the non-exclusive inclusion, so that a process, method, system, product, or device that includes a series of units is not necessarily limited to those units, but may include other units not expressly listed or inherent to such a process, method, product, or device.

Figure 1:
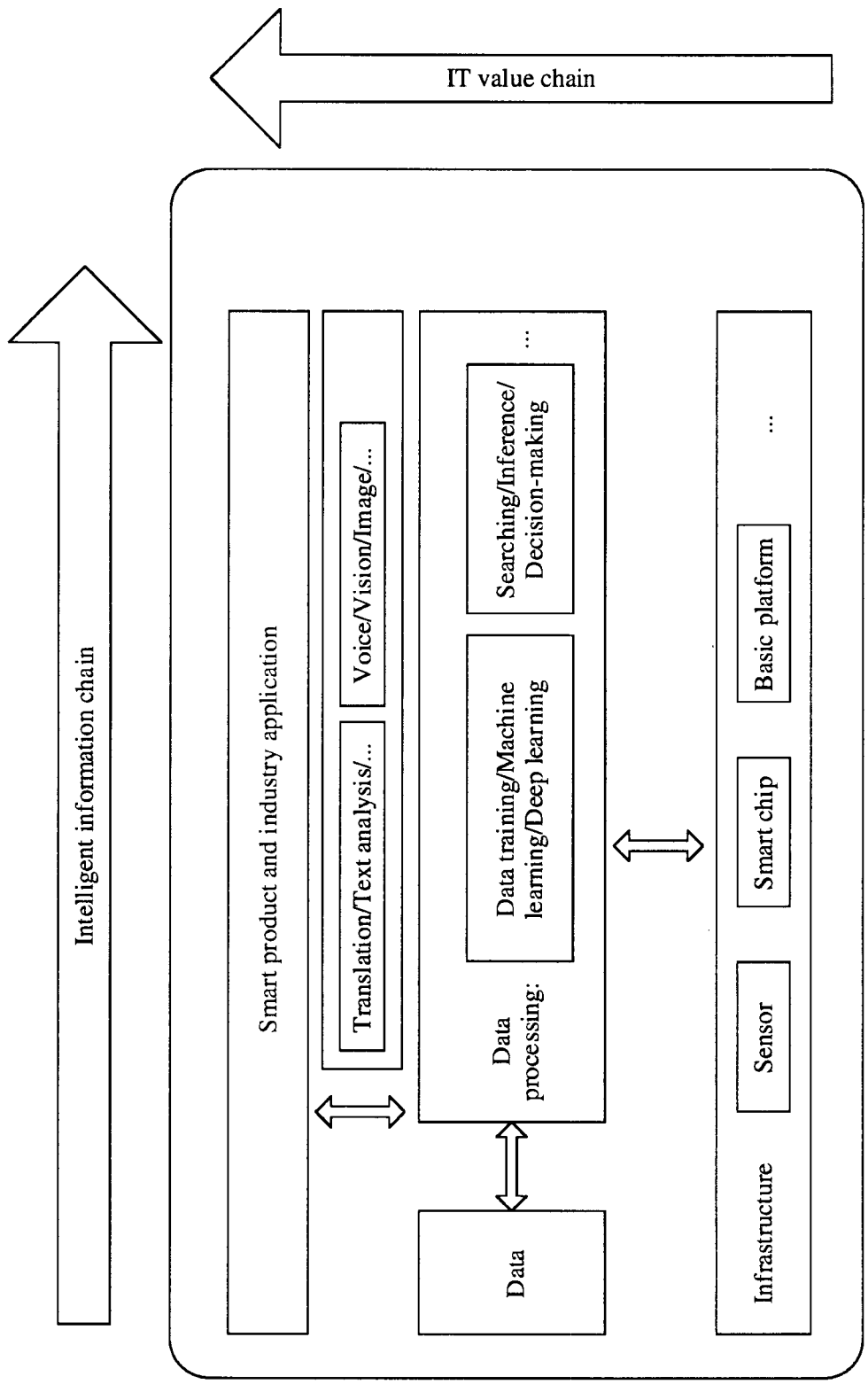
FIG. 1 is a schematic diagram of a structure of an artificial intelligence main framework.

An overall working procedure of an artificial intelligence system is first described with reference to FIG. 1. FIG. 1 is a schematic diagram of a structure of an artificial intelligence main framework. The following describes the artificial intelligence main framework from two dimensions: an "intelligent information chain" (a horizontal axis) and an "IT value chain" (a vertical axis). The "intelligent information chain" reflects a series of processes from obtaining data to processing the data. For example, the process may be a general process of intelligent information perception, intelligent information representation and formation, intelligent inference, intelligent decision-making, and intelligent execution and output. In this process, the data undergoes a refinement process of "data-information-knowledge-intelligence". The "IT value chain" reflects values brought by artificial intelligence to the information technology industry from an underlying infrastructure and information (technology implementation of providing and processing) of human intelligence to an industrial ecological process of a system.

(1) Infrastructure.

The infrastructure provides computing capability support for the artificial intelligence system, to implement communication with an external world, and implement support by using a basic platform. The infrastructure communicates with the outside by using a sensor. The computing capability is provided by smart chips (hardware acceleration chips such as a CPU, an NPU, a GPU, an ASIC, and an FPGA). The basic platform includes related platforms, for example, a distributed computing framework and network, to provide assurance and support. The basic platform may include a cloud storage and computing network, an interconnection network, and the like. For example, the sensor communicates with the outside to obtain data, and the data is provided to a smart chip in a distributed computing system provided by the basic platform for computing.

(2) Data.

Data at an upper layer of the infrastructure indicates a data source in the artificial intelligence field. The data relates to a graph, an image, voice, and a text, further relates to Internet of things data of a conventional device, and includes service data of an existing system and perception data such as force, displacement, a liquid level, a temperature, and humidity.

(3) Data Processing.

Data processing usually includes data training, machine learning, deep learning, searching, inference, decision-making, and the like.

By using the machine learning and deep learning, symbolic and formalized intelligent information modeling, extraction, preprocessing, training, and the like may be performed on data.

Inference is a process in which a human intelligent inference manner is simulated in a computer or an intelligent system, and machine thinking and problem resolving are performed by using formalized information according to an inference control policy. A typical function is searching and matching.

Decision-making is a process in which a decision is made after intelligent information is inferred, and functions such as classification, ranking, and prediction are usually provided.

(4) General Capability.

After data processing mentioned above is performed on the data, some general capabilities may further be formed based on a data processing result, for example, an algorithm or a general system such as translation, text analysis, computer vision processing, speech recognition, and image recognition.

(5) Smart Product and Industry Application.

The smart product and industry application are products and applications of the artificial intelligence system in various fields. The smart product and industry application involve the packaging of overall artificial intelligence solutions, to productize and apply intelligent information decision-making. Application fields of the intelligent information decision-making mainly include smart terminals, smart transportation, smart health care, autonomous driving, smart city, and the like.

The method provided in this disclosure is described from a model training side and a model application side in the following:

A model training method provided in embodiments of this disclosure may be specifically applied to data processing methods such as data training, machine learning, and deep learning, to perform symbolic and formalized intelligent information modeling, extraction, preprocessing, training, and the like on training data and finally obtain a trained neural network model (for example, an object neural network model in embodiments of this disclosure). In addition, the object neural network model may be used to perform model inference. Specifically, input data may be input to the object neural network model, to obtain output data.

Embodiments of this disclosure relate to massive application of a neural network. Therefore, for ease of understanding, the following first describes terms and concepts related to the neural network in embodiments of this disclosure.

(1) Neural Network.

The neural network may include a neuron. The neuron may be an operation unit that uses xs (the input data) and an intercept of 1 as an input. An output of the operation unit may be as follows:

s=1, 2, ..., or n, where n is a natural number greater than 1, Ws is a weight of xs, b is a bias of the neuron, and f indicates an activation function of the neuron, used for introducing a non-linear characteristic into the neural network, to convert an input signal in the neuron into an output signal. The output signal of the activation function may be used as an input of a next convolutional layer, and the activation function may be a sigmoid function. The neural network is a network formed by connecting a plurality of single neurons together. To be specific, an output of one neuron may be an input of another neuron. An input of each neuron may be connected to a local receptive field of a previous layer to extract a feature of the local receptive field. The local receptive field may be a region including a plurality of neurons.

(2) Convolutional neural network (CNN) is a deep neural network with a convolutional structure. The convolutional neural network includes a feature extractor including a convolutional layer and a sub-sampling layer. The feature extractor may be considered as a filter. A convolutional process may be considered as convolution performed on an input image or a convolutional feature plane (feature map) by using a trainable filter. The convolutional layer is a neuron layer that is in the convolutional neural network and at which convolution processing is performed on an input signal (for example, a first convolutional layer and a second convolutional layer that are in embodiments). At the convolutional layer of the convolutional neural network, one neuron may be connected only to some adjacent-layer neurons. One convolutional layer usually includes several feature planes, and each feature plane may include some neurons that are in a rectangular arrangement. Neurons in a same feature plane share a weight, and the weight shared herein is a convolutional kernel. Weight sharing may be understood as that an image information extraction manner is irrelevant to a location. A principle implied herein is that statistical information of a part of an image is the same as that of another part. This means that image information learned from a part can also be used in another part. Therefore, the image information obtained through same learning can be used for all locations on the image. At a same convolutional layer, a plurality of convolutional kernels may be used to extract different image information. Usually, a larger quantity of convolutional kernels indicates more image information reflected by performing a convolution operation.

The convolutional kernel may be initialized in a form of a matrix of a random size. In a process of training the convolutional neural network, the convolutional kernel may obtain an appropriate weight through learning. In addition, benefits directly brought by weight sharing are that connections among layers of the convolutional neural network are reduced, and an overfitting risk is reduced.

Figure 2:
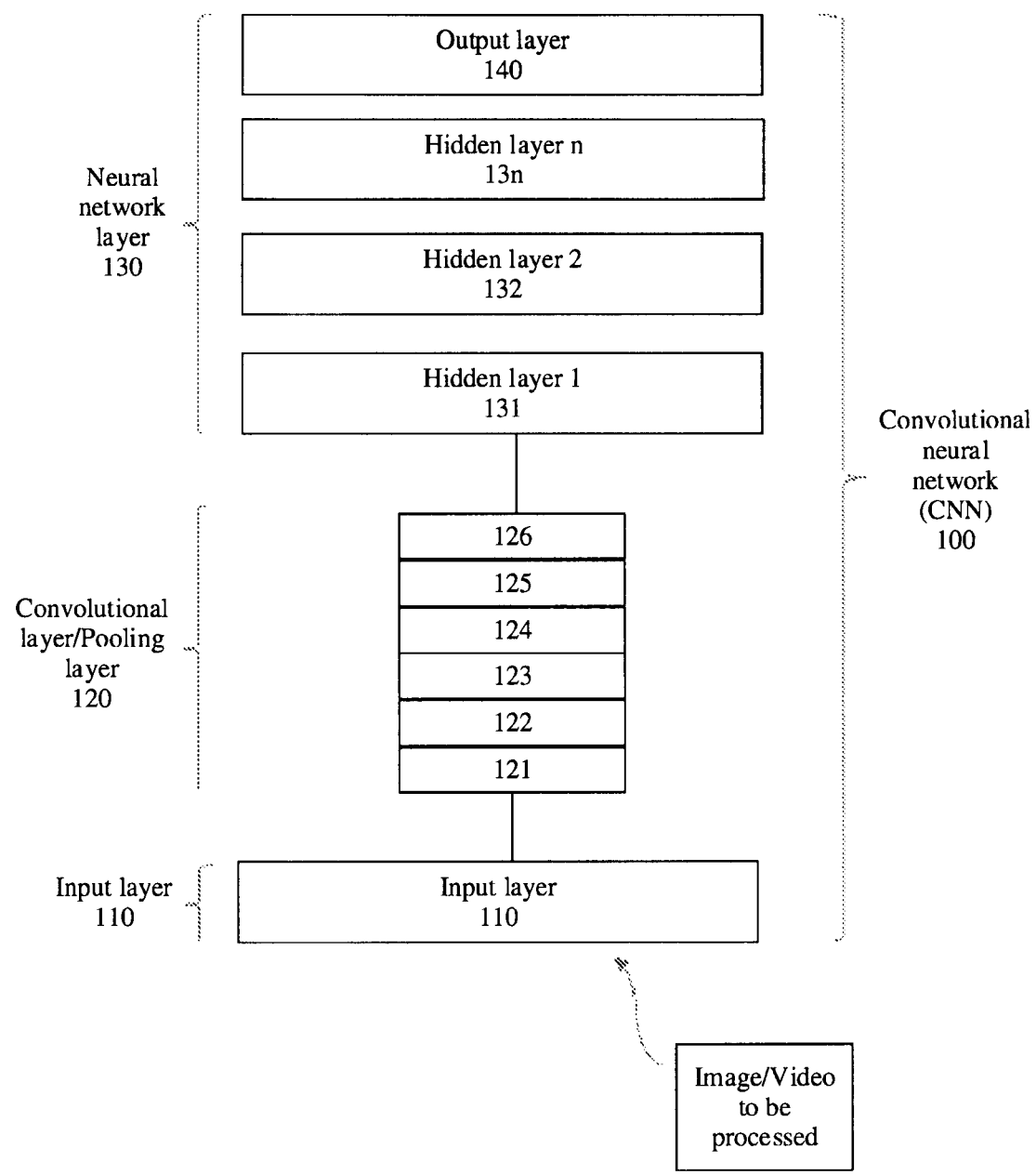
FIG. 2 is a schematic diagram of a convolutional neural network according to an embodiment of this disclosure.

Specifically, as shown in FIG. 2, a convolutional neural network (CNN) 100 may include an input layer 110, a convolutional layer/pooling layer 120 (where the pooling layer is optional), and a neural network layer 130.

A structure including the convolutional layer/pooling layer 120 and the neural network layer 130 may be the first convolutional layer and the second convolutional layer that are described in this disclosure. The input layer 110 is connected to the convolutional layer/pooling layer 120, the convolutional layer/pooling layer 120 is connected to the neural network layer 130. An output of the neural network layer 130 may be input to an activation layer, and the activation layer may perform non-linear processing on the output of the neural network layer 130.

Convolutional layer/Pooling layer 120: Convolutional layer: As shown in FIG. 2, for example, the convolutional layer/pooling layer 120 may include layers 121 to 126. In an implementation, the layer 121 is a convolutional layer, the layer 122 is a pooling layer, the layer 123 is a convolutional layer, the layer 124 is a pooling layer, the layer 125 is a convolutional layer, and the layer 126 is a pooling layer. In another implementation, the layers 121 and 122 are convolutional layers, the layer 123 is a pooling layer, the layers 124 and 125 are convolutional layers, and the layer 126 is a pooling layer. To be specific, an output of a convolutional layer may be used as an input of a subsequent pooling layer, or may be used as an input of another convolutional layer to continue to perform a convolution operation.

In an example of the convolutional layer 121, the convolutional layer 121 may include a plurality of convolution operators. The convolution operator is also referred to as a kernel. During image processing, the convolution operator functions as a filter that extracts specific information from an input image matrix. The convolution operator may essentially be a weight matrix, and the weight matrix is usually predefined. In a process of performing a convolution operation on an image, the weight matrix usually processes pixels at a granularity level of one pixel (or two pixels or the like, depending on a value of a stride) in a horizontal direction on an input image, to extract a specific feature from the image. A size of the weight matrix should be related to a size of the image. It should be noted that a depth dimension of the weight matrix is the same as a depth dimension of the input image. During a convolution operation, the weight matrix extends to an entire depth of the input image. Therefore, a convolutional output of a single depth dimension is generated through convolution with a single weight matrix. However, in most cases, a single weight matrix is not used, but a plurality of weight matrices with a same dimension are applied. Outputs of the weight matrices are stacked to form a depth dimension of a convolutional image. Different weight matrices may be used to extract different features from the image. For example, one weight matrix is used to extract edge information of the image, another weight matrix is used to extract a specific color of the image, still another weight matrix is used to blur unnecessary noise in the image, and the like. The plurality of weight matrices have same dimensions. Dimensions of feature maps that are extracted by the plurality of weight matrices with the same dimensions are the same. The plurality of extracted feature maps with the same dimensions are combined to form an output of the convolution operation.

Weight values in these weight matrices need to be obtained through a lot of training in actual application. Each weight matrix formed by using the weight values obtained through training may extract information from an input image, to help the convolutional neural network 100 perform correct prediction.

When the convolutional neural network 100 has a plurality of convolutional layers, a large quantity of general features are usually extracted at an initial convolutional layer (for example, 121). The general feature may also be referred to as a low-level feature. As the depth of the convolutional neural network 100 increases, a feature extracted at a subsequent convolutional layer (for example, 126) becomes more complex, for example, a high-level semantic feature. A feature with higher semantics is more applicable to a problem to be resolved.

Pooling layer: A quantity of training parameters usually needs to be reduced, and therefore, a pooling layer usually needs to be periodically introduced after a convolutional layer. To be specific, for the layers 121 to 126 in the layer 120 shown in FIG. 2, one convolutional layer may be followed by one pooling layer, or a plurality of convolutional layers may be followed by one or more pooling layers.

Neural network layer 130: After processing performed at the convolutional layer/pooling layer 120, the convolutional neural network 100 is not ready to output required output information. As described above, at the convolutional layer/pooling layer 120, only a feature is extracted, and parameters brought by an input image are reduced. However, to generate final output information (required class information or other related information), the convolutional neural network 100 needs to use the neural network layer 130 to generate an output of a quantity of one or a group of required classes. Therefore, the neural network layer 130 may include a plurality of hidden layers (such as 131 and 132 to 13$n$ shown in FIG. 2) and an output layer 140. Parameters included in the plurality of hidden layers may be obtained through pre-training based on related training data of a specific task type, for example, the task type may include image recognition, image classification, super-resolution image reconstruction, and the like.

After the plurality of hidden layers in the neural network layer 130, to be specific, the last layer of the entire convolutional neural network 100 is the output layer 140. The output layer 140 has a loss function similar to cross entropy for classification, and is specifically configured to calculate a prediction error. Once forward propagation (for example, propagation from 110 to 140 in FIG. 2 is forward propagation) of the entire convolutional neural network 100 is completed, back propagation (for example, propagation from 140 to 110 in FIG. 2 is back propagation) starts to update the weight value and a deviation of each layer mentioned above, to reduce a loss of the convolutional neural network 100 and an error between a result output by the convolutional neural network 100 through the output layer and an ideal result.

Figure 3:
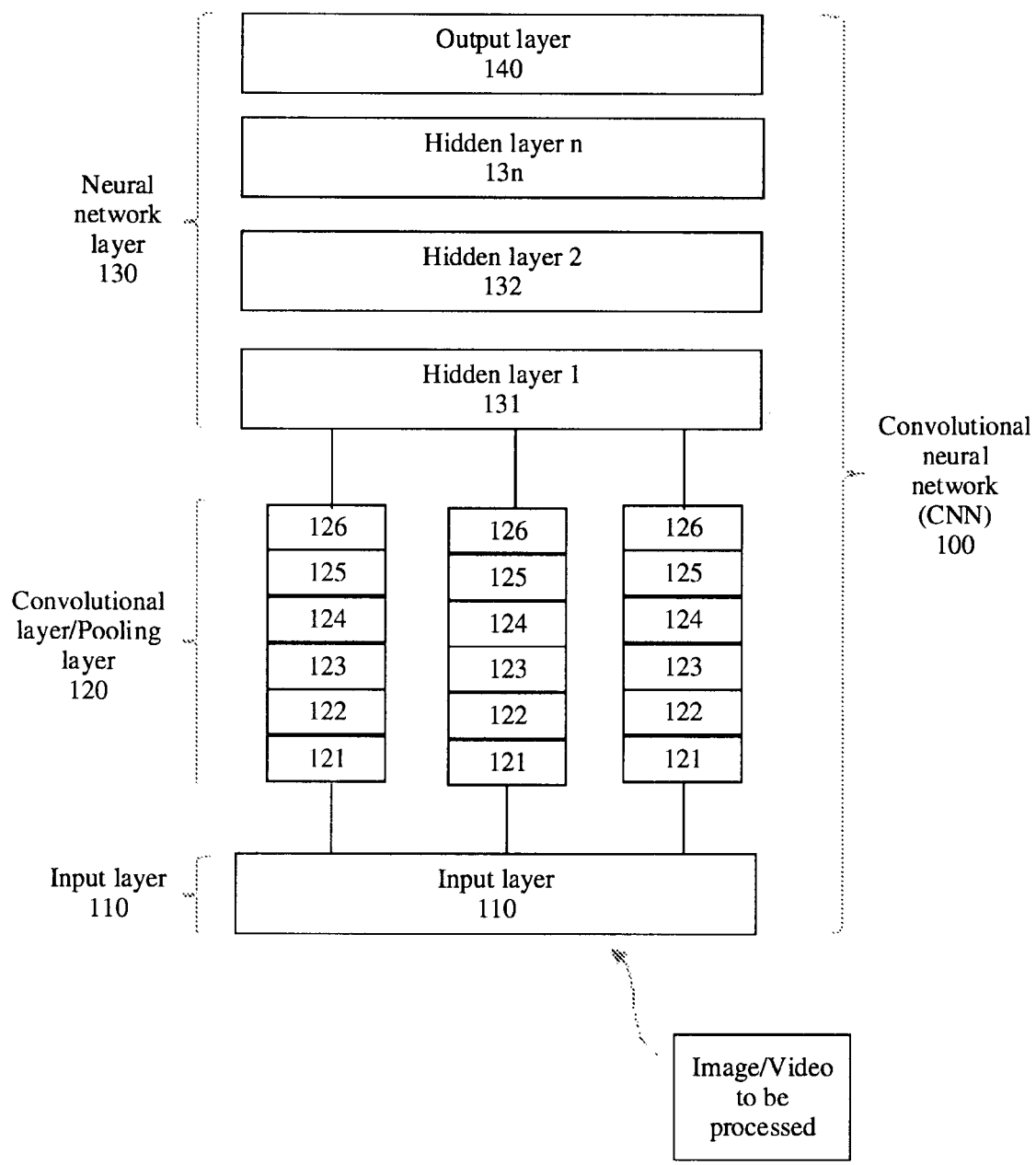
FIG. 3 is a schematic diagram of a convolutional neural network according to an embodiment of this disclosure.

It should be noted that the convolutional neural network 100 shown in FIG. 2 is merely an example of one convolutional neural network. During specific application, the convolutional neural network may alternatively exist in a form of another network model, for example, as shown in FIG. 3, a plurality of convolutional layers/pooling layers are in parallel, and features that are separately extracted are input to the neural network layer 130 for processing.

(3) Deep Neural Network.

The deep neural network (DNN) is also referred to as a multi-layer neural network, and may be understood as a neural network having a plurality of hidden layers. There is no special metric for "a plurality of" herein. The DNN is divided based on locations of different layers, and a neural network in the DNN may be divided into three types: an input layer, a hidden layer, and an output layer. Generally, a first layer is the input layer, a last layer is the output layer, and a middle layer is the hidden layer. Layers are fully connected. To be specific, any neuron at an $i^{th}$ layer is necessarily connected to any neuron at an $(i+1)^{th}$ layer. Although the DNN seems to be complex, the DNN is actually not complex in terms of work at each layer, and is simply expressed as the following linear relationship expression: $\vec{y} = \alpha(W\vec{x} + \vec{b})$. Herein, $\vec{x}$ is an input vector, $\vec{y}$ is an output vector, $\vec{b}$ is an offset vector, $W$ is a weight matrix (also referred to as a coefficient), and $\alpha(\ )$ is an activation function. At each layer, such a simple operation is performed on the input vector $\vec{x}$, to obtain the output vector $\vec{y}$. A quantity of DNN layers is large, and therefore, a quantity of coefficients $W$ and a quantity of offset vectors $\vec{b}$ are also large. These parameters are defined in the DNN as follows: The coefficient $W$ is used as an example. It is assumed that in a three-layer DNN, a linear coefficient from a fourth neuron at a second layer to a second neuron at a third layer is defined as $w_{24}^{3}$. The superscript 3 represents a layer at which the coefficient $W$ is located, and the subscript corresponds to an output third-layer index 2 and an input second-layer index 4.

In summary, a coefficient from a $k^{th}$ neuron at a $(L-1)^{th}$ layer to a $j^{th}$ neuron at an $L^{th}$ layer is defined as $W_{jk}^{L}$. It should be noted that the input layer does not have the parameter $W$. In the deep neural network, more hidden layers make the network more capable of describing a complex case in the real world. Theoretically, a model with more parameters has higher complexity and a larger "capacity". It indicates that the model can complete a more complex learning task. Training the deep neural network is a process of learning a weight matrix, and a final objective is to obtain a weight matrix of all layers of a trained deep neural network (a weight matrix including vectors $W$ of a plurality of layers).

(4) Loss Function.

In a process of training a deep neural network, because it is expected that an output of the deep neural network is as close as possible to a value that actually needs to be predicted, a current predicted value of the network and an actually expected object value may be compared, and then a weight vector of each layer of the neural network is updated based on a difference between the current predicted value and the object value (certainly, there is usually an initialization process before the first update, to be specific, parameters are preconfigured for all layers of the deep neural network). For example, if the predicted value of the network is large, the weight vector is adjusted to decrease the predicted value, and adjustment is continuously performed, until the deep neural network can predict the actually expected object value or a value that more approximates the actually expected object value. Therefore, "how to obtain a difference between the predicted value and the object value through comparison" needs to be predefined. This is a loss function or an objective function. The loss function and the objective function are important equations for measuring the difference between the predicted value and the object value. The loss function is used as an example. A higher output value (loss) of the loss function indicates a larger difference. Therefore, training of the deep neural network is a process of minimizing the loss as much as possible.

(5) Back Propagation Algorithm.

In a training process, a convolutional neural network may correct a value of a parameter of an initial super-resolution model by using an error back propagation algorithm, so that a reconstruction error loss of the super-resolution model becomes increasingly smaller. Specifically, an input signal is forward transferred until the error loss is generated in an output, and the parameter of the initial super-resolution model is updated through back propagation of information about the error loss, to converge the error loss. The back propagation algorithm is an error-loss-centered back propagation motion, and is intended to obtain a parameter, such as a weight matrix, of an optimal super-resolution model.

(6) Linear Operation.

Linearity is a proportional and straight-line relationship between quantities, and may be mathematically understood as a function whose first-order derivative is a constant. A linear operation may be but is not limited to an addition operation, an empty operation, an identity operation, a convolution operation, a batch normalization BN operation, and a pooling operation. The linear operation may alternatively be referred to as linear mapping. The linear mapping needs to meet two conditions: homogeneity and additivity. If any one of the conditions is not met, the linear mapping is non-linear.

Homogeneity is f(ax)=af(x), and additivity is f(x+y)=f(x)+f(y). For example, f(x)=ax is linear. It should be noted that x, a, and f(x) herein are not necessarily scalars, and may be vectors or matrices, to form linear space of any dimension. If x and f(x) are n-dimensional vectors, when a is a constant, it is equivalent that homogeneity is met; and when a is a matrix, it is equivalent that additivity is met. In contrast, a function graph that is a straight line does not necessarily comply with the linear mapping, for example, f(x)=ax+b, which does not meet the homogeneity and the additivity, belongs to non-linear mapping.

In this embodiment of this disclosure, a combination of a plurality of linear operations may be referred to as a linear operation, and each linear operation included in the linear operation may also be referred to as a sub-linear operation.

(7) Object Detection.

The object detection, also referred to as object extraction, is image segmentation that is based on geometric and statistical features of an object, and combines segmentation and recognition of the object. Accuracy and real-time performance of the object detection are important capabilities of an entire system. Especially in a complex scenario, automatic object extraction and recognition are particularly important when a plurality of objects need to be processed in real time. Essence of the object detection is positioning a plurality of objects, to be specific, a plurality of objects need to be positioned in an image, which includes classification and positioning. For example, the object detection is performed on an image, an obtained result is several animals, and a location of each animal corresponds to a rectangular frame. With the development of computer technologies and the widespread application of the computer vision principles, real-time object tracking through a computer image processing technology becomes an increasingly popular topic for research. Dynamic real-time object tracking and positioning can be widely used in an intelligent transportation system, an intelligent monitoring system, military object detection, surgical instrument positioning in a medical navigation surgery, and the like.

Figure 4:
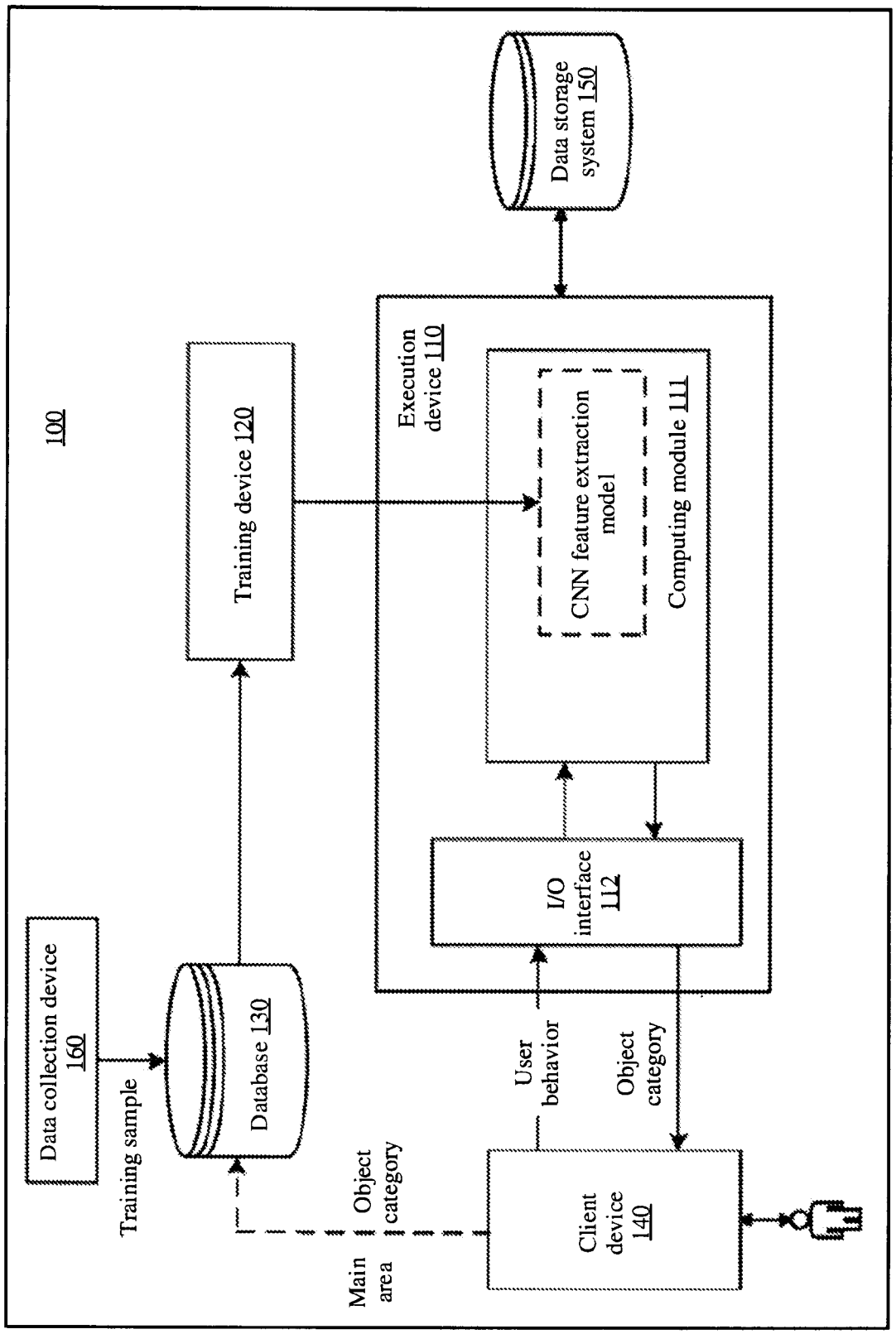
FIG. 4 is a schematic diagram of a system architecture according to an embodiment of this disclosure.

FIG. 4 is a schematic diagram of a system architecture according to an embodiment of this disclosure. In FIG. 4, an input/output (I/O) interface 112 is configured in an execution device 110, to exchange data with an external device. A user may input data to the I/O interface 112 by using a client device 140.

In a process in which the execution device 110 preprocesses the input data, or in a process in which a computing module 111 of the execution device 110 performs related processing such as computing (for example, the computing module 111 implements functions of the neural network in this disclosure), the execution device 110 may invoke data, code, and the like in a data storage system 150 for corresponding processing, or may store, in the data storage system 150, data, instructions, and the like that are obtained through corresponding processing.

Finally, the I/O interface 112 returns a processing result to the client device 140, to provide the processing result for the user.

Optionally, the client device 140 may be, for example, a control unit in an autonomous driving system or a function algorithm module in a mobile phone terminal. For example, the function algorithm module may be configured to implement a related task.

It should be noted that a training device 120 may generate corresponding object models/rules (for example, the object neural network model in embodiments of this disclosure) for different objects or different tasks based on different training data. The corresponding object models/rules may be used to implement the foregoing objects or complete the foregoing tasks, to provide a required result for the user.

In a case shown in FIG. 4, the user may manually provide input data and the user may manually provide the input data in an interface provided by the I/O interface 112. In another case, the client device 140 may automatically send input data to the I/O interface 112. If it is required that the client device 140 needs to obtain authorization from the user to automatically send the input data, the user may set corresponding permission on the client device 140. The user may view, on the client device 140, a result output by the execution device 110. Specifically, the result may be presented in a form of displaying, a sound, an action, or the like. The client device 140 may alternatively be used as a data collection end, to collect, as new sample data, input data that is input to the I/O interface 112 and an output result that is output from the I/O interface 112 that are shown in the figure, and store the new sample data in the database 130. Certainly, the client device 140 may alternatively not perform collection. Instead, the I/O interface 112 directly stores, in the database 130 as new sample data, the input data input to the I/O interface 112 and the output result output from the I/O interface 112 that are shown in the figure.

It should be noted that FIG. 4 is merely a schematic diagram of a system architecture according to an embodiment of this disclosure. A location relationship between a device, a component, a module, and the like shown in the figure constitutes no limitation. For example, in FIG. 4, the data storage system 150 is an external memory relative to the execution device 110. In another case, the data storage system 150 may alternatively be disposed in the execution device 110.

Currently, convolutional neural network-based deep learning has good performance in processing a computer vision task. However, in this type of convolutional neural network, a large quantity of multiplication operations are usually included, resulting in high power consumption of the network. Therefore, an adder neural network in which an addition operation replaces a multiplication operation is proposed in a related technology, to reduce power consumption of network computing. In hardware computing, computing efficiency of the addition operation is higher than computing efficiency of the multiplication operation, and power consumption of the addition operation is lower than power consumption of the multiplication operation. Therefore, the power consumption of network computing can be effectively reduced by using the adder neural network in which the addition operation replaces the multiplication operation in the network. The adder neural network can achieve lossless precision in an image classification task and effectively reduce the power consumption of the network.

However, the adder neural network in the related technology is mainly applied to the field of technologies such as image classification or image restoration. Currently, it is usually difficult to obtain an effective detection result when the adder neural network is applied to object detection.

Generally, an object detection network usually includes a backbone network (backbone), a feature fusion network, and a prediction head. The backbone network is used to extract features of different scales from an input image, for example, different low-level features and high-level features. The low-level feature has high resolution, includes rich location information, but has weak semantic information. On the contrary, the high-level feature has low resolution, and rich semantic information. The feature fusion network is used to perform multi-scale feature fusion on a feature output by the backbone network, to enhance a feature expression capability. The prediction head is used to perform object detection based on a fused feature output by the feature fusion network, to obtain an object detection result.

Figure 5:
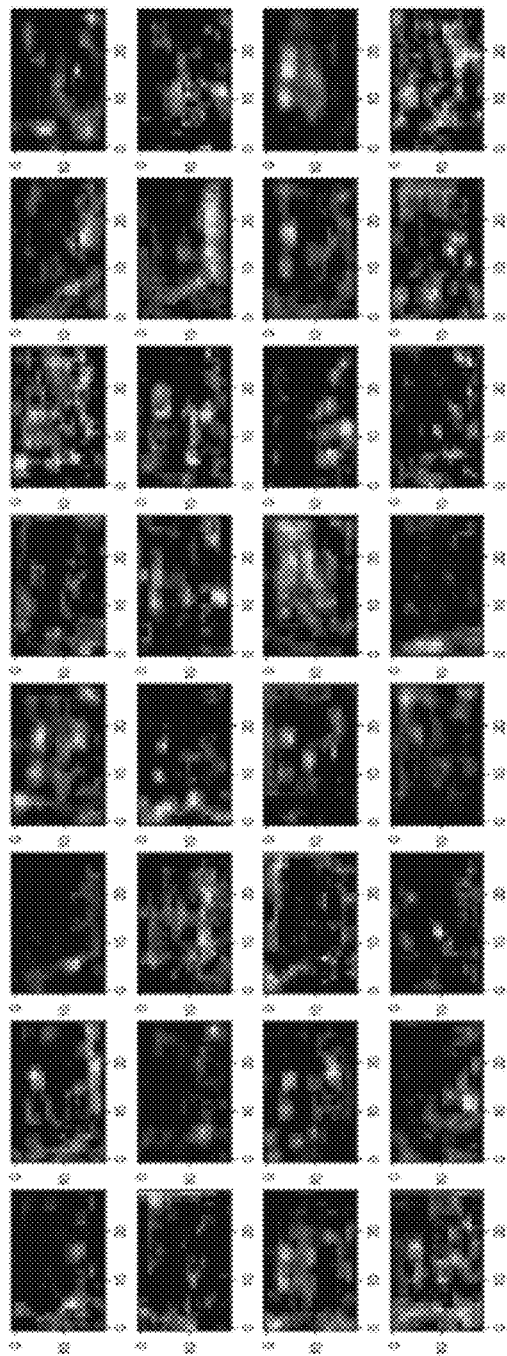
FIG. 5 is a schematic diagram of comparison of high-level features according to an embodiment of this disclosure.
Figure 5:
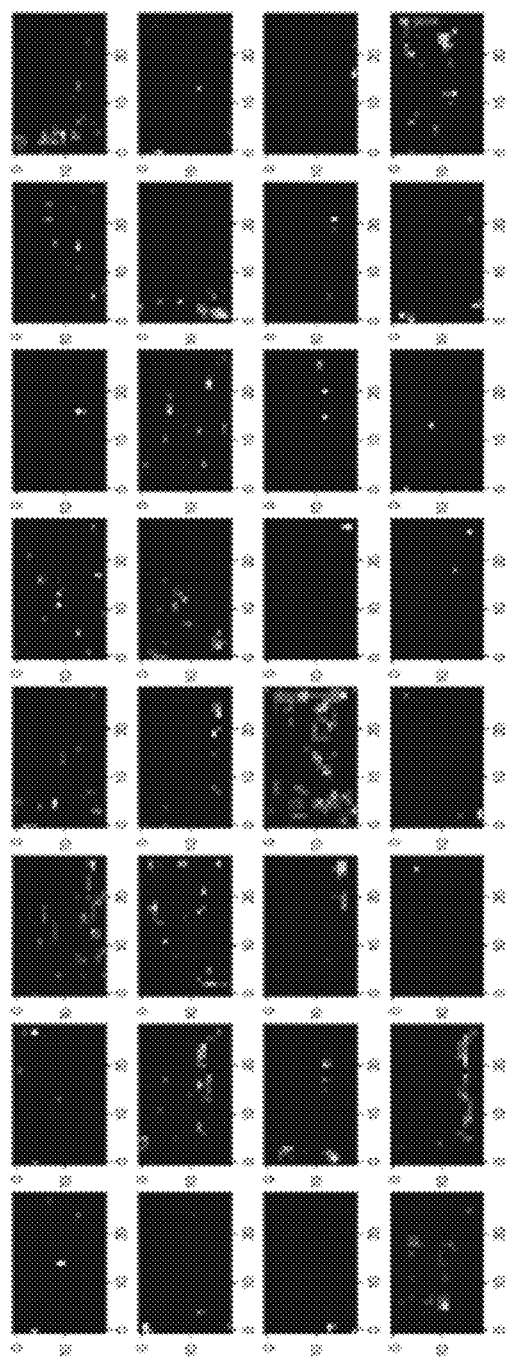

The inventor finds through research that, when the backbone network uses the adder neural network, compared with a multiplicative neural network, the high-level feature extracted by the backbone network usually presents an obvious sparse characteristic. Specifically, refer to FIG. 5. FIG. 5 is a schematic diagram of comparison of high-level features according to an embodiment of this disclosure. As shown in FIG. 5, FIG. 5(*a*) represents a high-level feature extracted by the multiplication neural network, and FIG. 5(*b*) represents a high-level feature extracted by the adder neural network. Apparently, the high-level feature extracted by the adder neural network has an obvious sparse characteristic. This sparse characteristic is mainly caused by an addition operation in the adder neural network.

Figure 6:
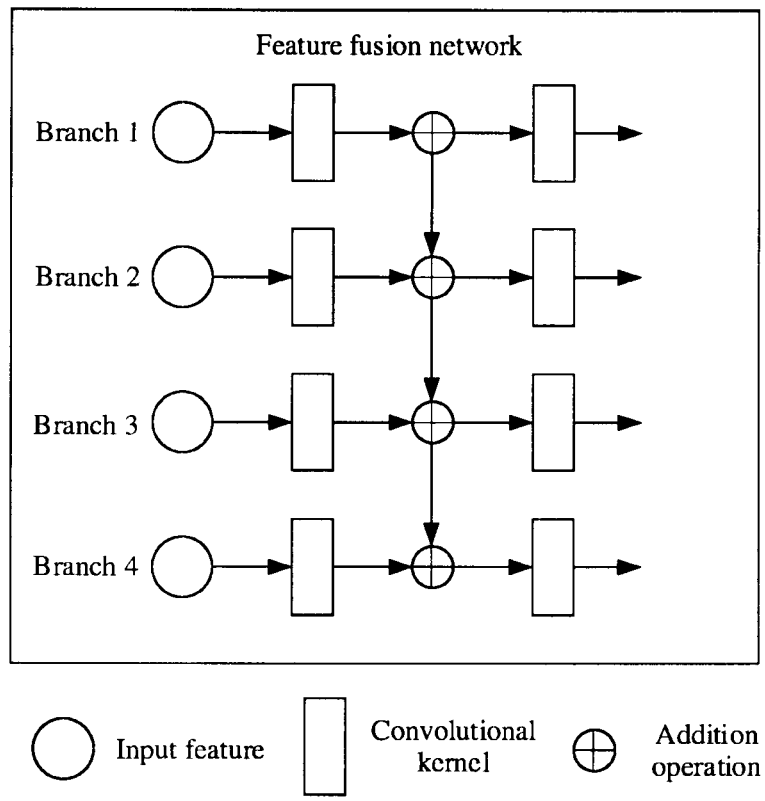
FIG. 6 is a schematic diagram of a structure of a feature fusion network in a related technology.

Refer to FIG. 6. FIG. 6 is a schematic diagram of a structure of a feature fusion network in a related technology. As shown in FIG. 6, the feature fusion network in the related technology includes a plurality of branches. An input of each branch is a feature extracted by a backbone network, and inputs of the branches are different. From branches 1 to 4, resolution of input features gradually increases. The input feature of the branch 1 is a high-level feature with minimum resolution, and the input feature of the branch 4 is a low-level feature with maximum resolution. In a feature fusion process, the feature fusion network fuses the high-level feature to the low-level feature from a high level to a low level. In this way, when an adder neural network is used as the backbone network, the high-level feature extracted by the backbone network has an obvious sparse characteristic. Therefore, when the high-level feature is fused to the low-level feature, the low-level feature is damaged, and finally object detection precision is affected.

In view of this, an embodiment of this disclosure provides an image processing method that is based on an adder neural network. In a stage of feature fusion, a low-level feature is fused to a high-level feature from a low level to a high level, to compensate for sparseness of the high-level feature, so that object detection precision is improved and a problem that an adder neural network cannot be applied to object detection is solved.

The image processing method provided in this embodiment of this disclosure may be applied to photographing, video recording, a smart city, human-computer interaction, another scenario in which the object detection needs to be performed, and the like.

It should be understood that an image in this embodiment of this disclosure may be a static image (or referred to as a static frame) or a dynamic image (or referred to as a dynamic frame). For example, the image in this embodiment of this disclosure may be a video or a dynamic picture, or the image in this embodiment of this disclosure may be a static picture or a photo. For ease of description, the static image or the dynamic image is collectively referred to as images in the following embodiments of this disclosure.

The method in this embodiment of this disclosure may be specifically applied to an image recognition scenario. The following describes this scenario in detail.

Image Recognition:

After a user shoots an image by using a terminal such as a mobile phone or a tablet computer, the terminal may recognize the image shot by the user, to obtain an object included in the image. For example, the terminal may automatically recognize that the shot object is a flower, an animal, a car, or the like. Further, the terminal may further mark the recognized object by using a rectangular frame, to implement object detection.

It should be understood that the image recognition described above is merely a specific scenario to which the method in this embodiment of this disclosure is applied. The method in this embodiment of this disclosure is not limited to the foregoing scenario during application. The method in this embodiment of this disclosure can be applied to any scenario in which object detection needs to be performed, which is not limited in this embodiment of this disclosure.

A function of the feature extraction kernel mentioned in this embodiment in image processing is equivalent to a filter for extracting specific information from an input image matrix. The feature extraction kernel is a weight matrix. In a process of performing a convolution operation on an image, the weight matrix usually processes pixels at a granularity level of one pixel (or two pixels or the like, depending on a value of a stride) in a horizontal direction on an input image, to extract a specific feature from the image.

Figure 7:
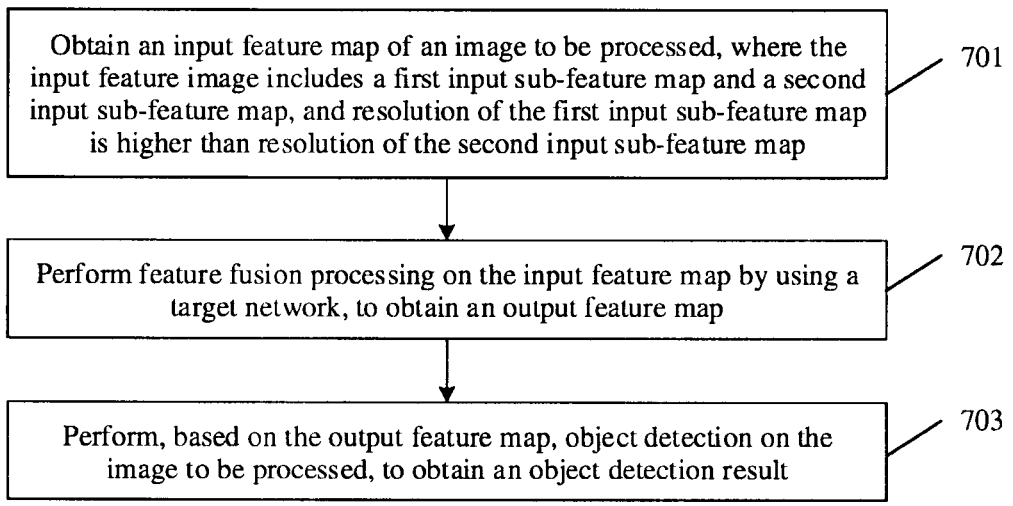
FIG. 7 is a schematic flowchart of an image processing method according to an embodiment of this disclosure.

Refer to FIG. 7. FIG. 7 is a schematic flowchart of an image processing method according to an embodiment of this disclosure. As shown in FIG. 7, the image processing method may include steps 701 to 703 below.

Step 701: Obtain an input feature map of an image to be processed, where the input feature map includes a first input sub-feature map and a second input sub-feature map, and resolution of the first input sub-feature map is higher than resolution of the second input sub-feature map.

The image to be processed is an image on which object detection needs to be performed. The image to be processed may be an image shot by a terminal by using a camera, or the image to be processed may be an image obtained from an interior of a terminal (for example, an image stored in an album of the terminal, or an image obtained by the terminal from a cloud). Correspondingly, the input feature map of the image to be processed may be a feature map of the image. Alternatively, the input feature map may be a feature map obtained after being processed by a backbone network in an object detection network, and the backbone network may be an adder neural network.

The adder neural network in this embodiment of this disclosure may include one or more addition filtering layers, and may further include the input layer, the pooling layer, the hidden layer, the output layer, or another layer shown in FIG. 2, which is not limited in this embodiment of this disclosure. The adder neural network may include a plurality of addition filtering layers, and each addition filtering layer may include one or more feature extraction kernels. To be specific, the adder neural network may include a plurality of feature extraction kernels. Correspondingly, feature extraction processing may be performed on the image to be processed for a plurality of times by using the plurality of feature extraction kernels, to obtain an input feature map. The input feature map includes a plurality of input sub-feature maps.

The feature extraction processing performed on the image to be processed by using the feature extraction kernel may be an addition operation or a subtraction operation.

The addition operation is that: addition is performed between a feature extraction kernel and an element at a corresponding location in an input image to obtain a target matrix, and after absolute values are taken for elements in the target matrix, the absolute values are summed.

Optionally, if a target matrix is obtained by performing subtraction between a feature extraction kernel and an element at a corresponding location in an input image, the feature extraction processing operation may also be referred to as a subtraction operation. In this case, after absolute values are taken for elements in the target matrix, the absolute values are summed, to obtain a result of the feature extraction operation. In other words, in this embodiment of this disclosure, the target matrix may be obtained by performing matrix addition or matrix subtraction on an input sub-feature map corresponding to the target matrix and the feature extraction kernel.

Step 702: Perform feature fusion processing on the input feature map by using a target network, to obtain an output feature map.

The target network is an adder neural network. Convolution processing performed by the feature extraction kernel that is in the target network and that is used to perform feature extraction processing is the foregoing addition operation or subtraction operation.

The target network includes a plurality of branches configured to perform feature fusion processing. The plurality of branches include a first branch and a second branch. The first branch is configured to perform feature extraction processing on the first input sub-feature map, to obtain a first sub-feature map and a first output sub-feature map. The first sub-feature map is an intermediate feature obtained by the first branch.

Optionally, when the first branch is a branch at a lowest level, the first sub-feature map obtained by the first branch may be a feature map obtained after feature extraction processing is performed on the first input sub-feature map by using the feature extraction kernel. Alternatively, the first sub-feature map may be a feature map obtained when the feature extraction processing is not performed by the first branch, to be specific, the first sub-feature map may be the same as the first input sub-feature map. When the first branch is not a branch at the lowest level, the first sub-feature map obtained by the first branch may be obtained after the first branch performs fusion processing on the first input sub-feature map and a feature map transferred by another branch.

The second branch is configured to perform feature extraction processing on the second input sub-feature map and the first sub-feature map, to obtain a second output sub-feature map. The output feature map includes the first output sub-feature map and the second output sub-feature map.

Optionally, that the second branch performs feature extraction processing on the second input sub-feature map and the first sub-feature map may be that the second input sub-feature map and the first sub-feature map that is obtained after down-sampling processing is performed are added, to obtain a second sub-feature map, and the feature extraction processing is performed on the second sub-feature map, to obtain the second output sub-feature map. Resolution of the first sub-feature map obtained through processing by the first branch is higher than resolution of the second input sub-feature map in the second branch. Therefore, down-sampling processing may be performed on the first sub-feature map, so that the resolution of the first sub-feature map is the same as the resolution of the second input sub-feature map. Then, the second input sub-feature map and the first sub-feature map that is obtained after down-sampling processing is performed are added, to obtain the second sub-feature map.

In other words, for the first branch that processes the first input sub-feature map with high resolution, the first branch transfers an intermediate feature obtained by processing the first input sub-feature map to the second branch that processes the second input sub-feature map with low resolution. In other words, a low-level feature is fused to a high-level feature from a low level to a high level, so that sparsity of the high-level feature processed in the second branch is compensated.

It may be understood that, in addition to the two branches: the first branch and the second branch, the target network may further include another branch configured to perform feature fusion, for example, a third branch, a fourth branch, and the like. In actual application, a quantity of branches in the target network may be determined based on an actual requirement. For example, the target network includes three to seven branches. The quantity of branches included in the target network is not specifically limited in this embodiment.

For example, when the target network further includes the third branch, the input feature map further includes a third input sub-feature map. The third branch is configured to perform feature extraction processing on the third input sub-feature map and an intermediate feature obtained through processing by the second branch, to obtain a third output sub-feature map. In other words, the second branch also transfers, to the third branch, the intermediate feature obtained by processing the second input sub-feature map, to further compensate for sparsity of a high-level feature processed in the third branch.

Figure 8:
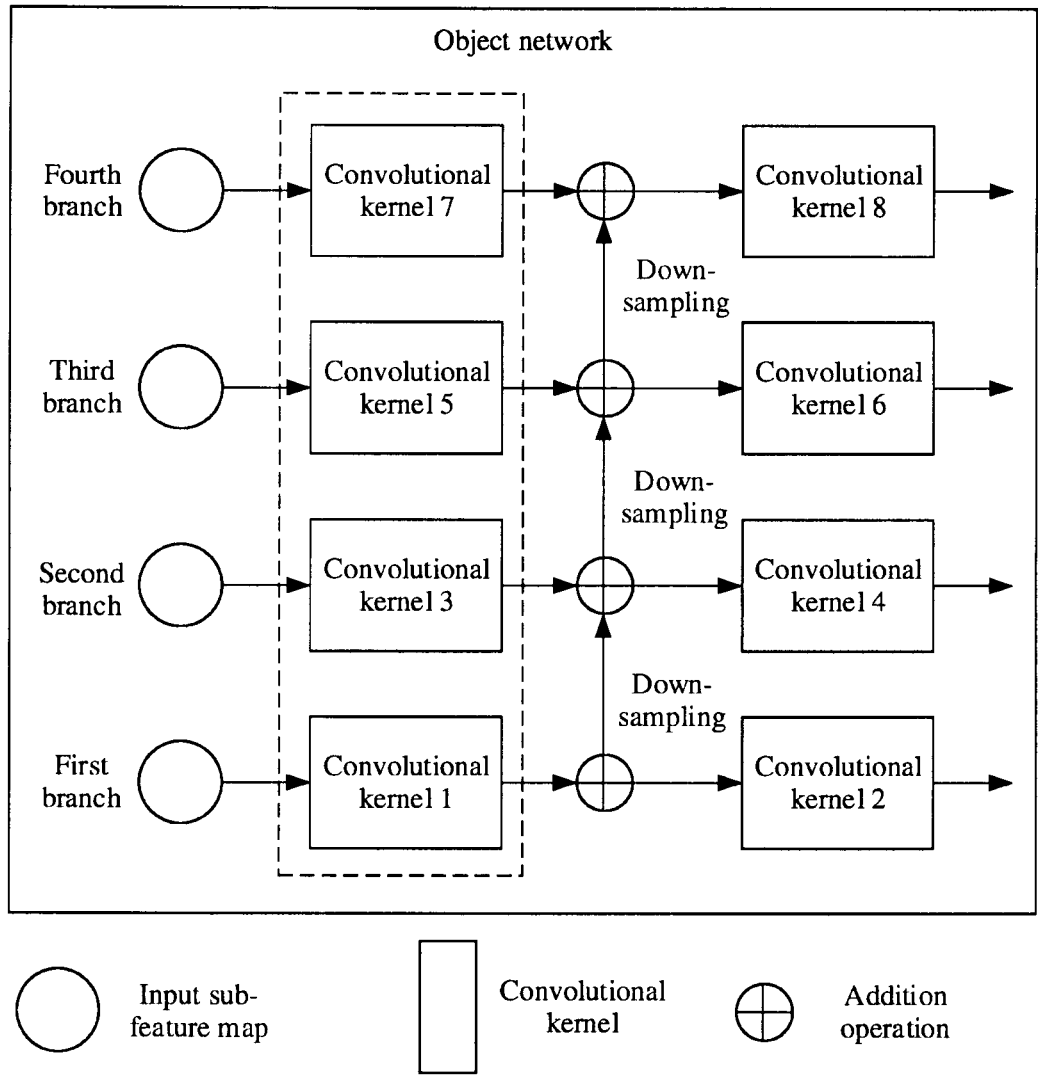
FIG. 8 is a schematic diagram of a structure of a target network according to an embodiment of this disclosure.

For example, refer to FIG. 8. FIG. 8 is a schematic diagram of a structure of a target network according to an embodiment of this disclosure. As shown in FIG. 8, the target network includes a first branch, a second branch, a third branch, and a fourth branch. Inputs of the first branch, the second branch, the third branch, and the fourth branch are respectively a first input sub-feature map, a second input sub-feature map, a third input sub-feature map, and a fourth input sub-feature map. In FIG. 8, feature extraction kernels (a feature extraction kernel 1, a feature extraction kernel 2, a feature extraction kernel 3, and a feature extraction kernel 4) in a dashed box represent optional feature extraction kernels. In actual application, the target network may include the feature extraction kernels in the dashed box, or the target network does not include the feature extraction kernels in the dashed box.

In the first branch, the first branch may perform convolution processing on the first input sub-feature map by using the feature extraction kernel 1, to obtain a first sub-feature map, and the first sub-feature map is transferred to the second branch. Then, the first branch continues to perform convolution processing on the first sub-feature map by using the feature extraction kernel 2, to obtain a first output sub-feature map. Optionally, the first branch may directly transfer the first input sub-feature map to the second branch, and perform convolution processing on the first input sub-feature map by using the feature extraction kernel 2, to obtain a first output sub-feature map.

In the second branch, the second branch may perform convolution processing on the second input sub-feature map by using the feature extraction kernel 3. The second input sub-feature map obtained after feature extraction processing is performed and the first sub-feature map obtained after down-sampling processing is performed are added, to obtain a second sub-feature map, and the first sub-feature map is transferred to the third branch. Then, the third branch continues to perform convolution processing on the second sub-feature map by using the feature extraction kernel 4, to obtain a second output sub-feature map. Optionally, the second branch may directly add the second input sub-feature map and the first sub-feature map that is obtained after the down-sampling processing is performed, to obtain a second sub-feature map, and perform convolution processing on the obtained second sub-feature map by using the feature extraction kernel 4, to obtain a second output sub-feature map.

Similarly, the third branch obtains a feature transferred by the second branch, and performs feature fusion processing, to obtain a third output sub-feature map. The fourth branch obtains a feature transferred by the third branch, and performs feature fusion processing, to obtain a fourth output sub-feature map. Processing processes of the third branch and the fourth branch are not described in detail herein again.

In a possible embodiment, a skip connection structure may be introduced in a branch of the target network, to enhance a feature learning capability of the target network. The following uses the second branch as an example to describe the skip connection structure introduced in the target network.

Figure 9:
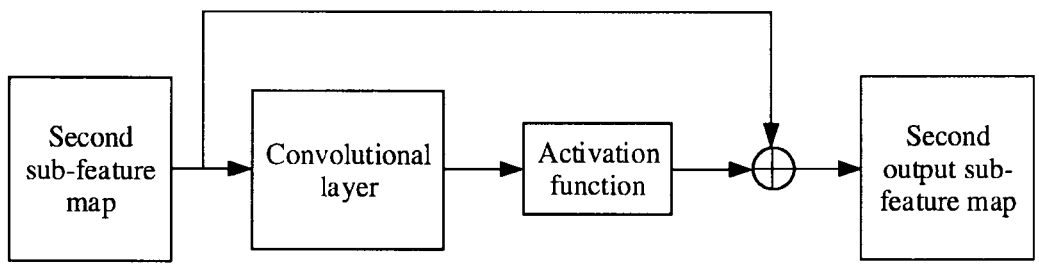
FIG. 9 is a schematic diagram of a skip connection structure according to an embodiment of this disclosure.

For example, refer to FIG. 9. FIG. 9 is a schematic diagram of a skip connection structure according to an embodiment of this disclosure. That the second branch performs feature extraction processing on the second sub-feature map includes: the second branch processes the second sub-feature map by using a convolutional layer (for example, an addition filtering layer) and an activation function to obtain a third sub-feature map, and the convolutional layer may include one or more feature extraction kernels. The second branch adds the second sub-feature map and the third sub-feature map, to obtain the second output sub-feature map. In other words, in FIG. 9, the skip connection structure includes a convolutional layer and an activation function. The second sub-feature map is processed by using the skip connection structure, to obtain the second output sub-feature map.

In this embodiment, for a defect in an expression capability of an addition feature extraction kernel, the skip connection structure is designed to enhance an expression capability of a convolutional unit in the target network, so that a feature learning capability of the target network is enhanced.

For example, for a feature extraction kernel in a multiplication neural network (to be specific, a multiplication feature extraction kernel), an input and an output of the multiplication feature extraction kernel may be the same by using a weight of the multiplication feature extraction kernel. However, for the addition feature extraction kernel, an input and an output of the addition feature extraction kernel are definitely different. Therefore, compared with the multiplication neural network, an expression capability of the addition feature extraction kernel has a specified defect, which is prone to lead to a poor feature learning capability of the adder neural network.

After the skip connection structure is introduced, an input of the skip connection structure may be set to 0 by using the feature extraction kernel and the activation function in the skip connection structure, so that a final output of the skip connection structure is the same as the input of the skip connection structure. For example, in FIG. 9, a weight of the convolutional layer and the activation function are adjusted, so that the third sub-feature map obtained by processing the second sub-feature map by using the convolutional layer and the activation function is 0. In this way, after the second sub-feature map and the third sub-feature map are added, the output second output sub-feature map is the same as the second sub-feature map.

In a possible embodiment, the second branch is further configured to perform feature extraction processing on the second sub-feature map, to obtain a fourth sub-feature map, and the fourth sub-feature map is an intermediate feature obtained by the second branch. When the second branch is not a branch at a highest level, that the second branch performs feature extraction processing on the second sub-feature map may be that: the second branch processes the second sub-feature map by using the feature extraction kernel, and the second sub-feature map obtained after feature extraction processing is performed and a feature map that is obtained after up-sampling processing is performed and that is transferred by an upper-level branch are added, to obtain the fourth sub-feature map. When the second branch is a branch at a highest level, that the second branch performs feature extraction processing on the second sub-feature map may be that: the second branch processes the second sub-feature map by using the feature extraction kernel, to obtain the fourth sub-feature map.

That the first branch performs feature extraction processing on the first input sub-feature map includes: the first branch performs feature extraction processing on the first sub-feature map, to obtain the first sub-feature map; the first branch adds the first sub-feature map and the fourth sub-feature map that is obtained after up-sampling processing is performed, to obtain a fifth sub-feature map; and the first branch performs feature extraction processing on the fifth feature map, to obtain the first output sub-feature map.

Figure 10:
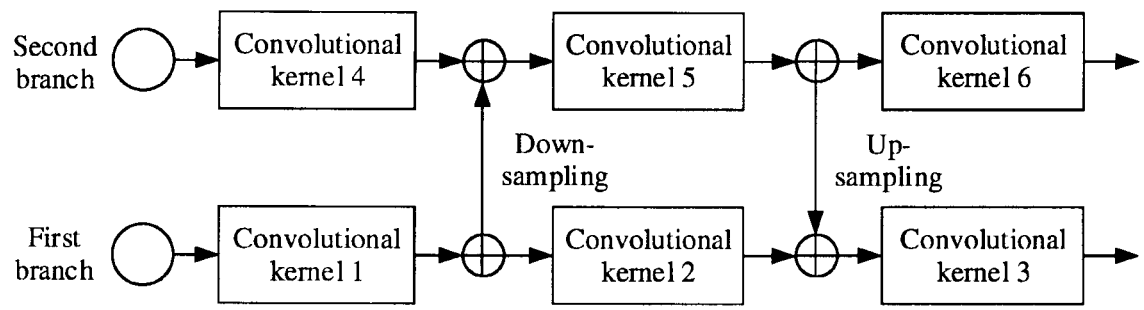
FIG. 10 is a schematic diagram of a network architecture according to an embodiment of this disclosure.

For example, refer to FIG. 10. FIG. 10 is a schematic diagram of a network architecture according to an embodiment of this disclosure. As shown in FIG. 10, both a first branch and a second branch include three feature extraction kernels. The first branch processes an input first input sub-feature map by using a feature extraction kernel 1, and a first sub-feature map obtained through processing is transferred to the second branch. The second branch processes an input second input sub-feature map by using a feature extraction kernel 4, and a processed second input sub-feature map and a first sub-feature map that is obtained after down-sampling processing is performed are added, to obtain a second sub-feature map. The second branch processes the second sub-feature map by using a feature extraction kernel 5, to obtain a fourth sub-feature map, and the fourth sub-feature map is transferred to the first branch. The first branch processes the first sub-feature map by using a feature extraction kernel 2, and the processed first sub-feature map and the fourth sub-feature map transferred by the second branch are added, to obtain a fifth sub-feature map. Finally, the first branch processes the fifth sub-feature map by using a feature extraction kernel 3, to obtain a first output sub-feature map. The second branch processes the fourth sub-feature map by using a feature extraction kernel 6, to obtain a second output sub-feature map.

In this embodiment, after a low-level feature is first fused to a high-level feature from a low level to a high level, then a processed high-level feature is fused to the low-level feature, so that rich semantic information is introduced to the low-level feature to improve a feature fusion effect, which improves object detection precision of a network.

Optionally, a skip connection structure may also be introduced in the first branch, to enhance a feature learning capability of the first branch.

For example, that the first branch performs feature extraction processing on the fifth feature map, to obtain the first output sub-feature map includes: the first branch processes the fifth sub-feature map by using a convolutional layer and an activation function, to obtain a sixth sub-feature map; and the first branch adds the fifth sub-feature map and the sixth sub-feature map, to obtain the first output sub-feature map.

Step 703: Perform, based on the output feature map, object detection on the image to be processed, to obtain an object detection result.

Optionally, after the output feature map is obtained, the output feature map may be processed by using a prediction head, to obtain the object detection result. The prediction head may be an adder neural network. The prediction head includes one or more addition filtering layers, and each addition filtering layer may include one or more feature extraction kernels. The prediction head processes the output feature map by using the addition filtering layer, to obtain a final object detection result.

Figure 11:
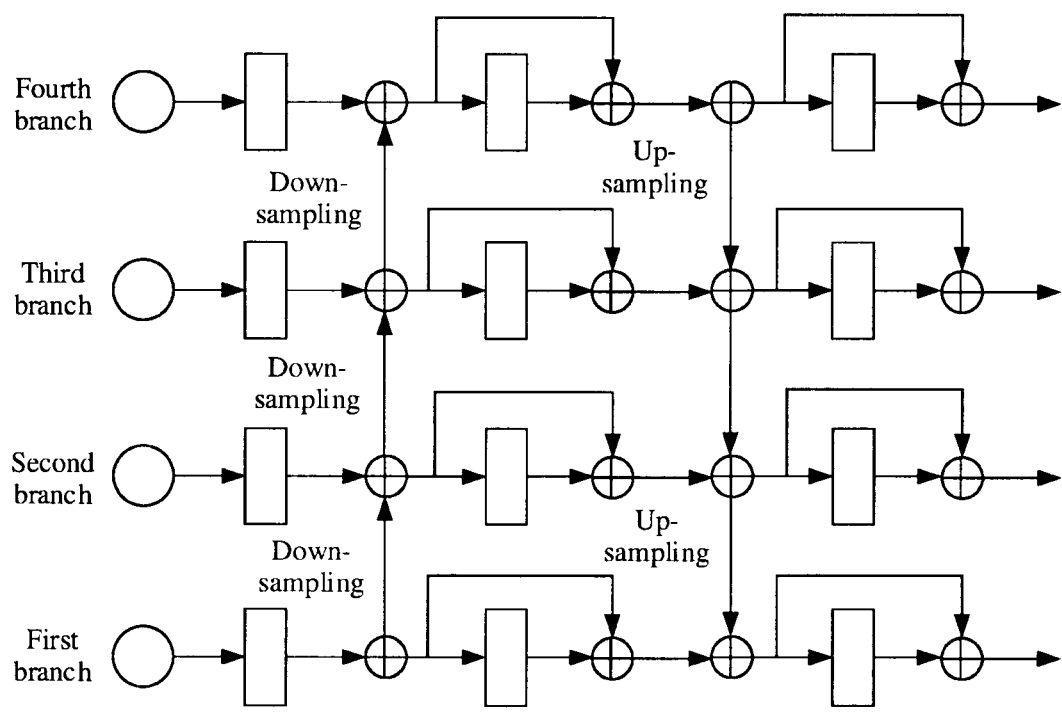
FIG. 11 is a schematic diagram of a structure of a target network according to an embodiment of this disclosure.

For example, refer to FIG. 11. FIG. 11 is a schematic diagram of a structure of a target network according to an embodiment of this disclosure. As shown in FIG. 11, the target network includes a plurality of branches. Each branch includes one feature extraction kernel, two addition structures, and two skip connection structures. An activation function in the skip connection structure is not shown in FIG. 11. For one branch in the target network, after the branch processes on an input sub-feature map by using the feature extraction kernel, an obtained sub-feature map and a sub-feature map that is transferred by a lower-level branch and that is obtained after down-sampling processing is performed are added, to obtain an added sub-feature map 1. After being processed by using a first skip connection structure, the added sub-feature map and a sub-feature map that is transferred by an upper-level branch and that is obtained after up-sampling processing is performed are added, to obtain an added sub-feature map 2. Finally, the added sub-feature map 2 is processed by using a second skip connection structure, to obtain an output sub-feature map.

Figures 12, 13:
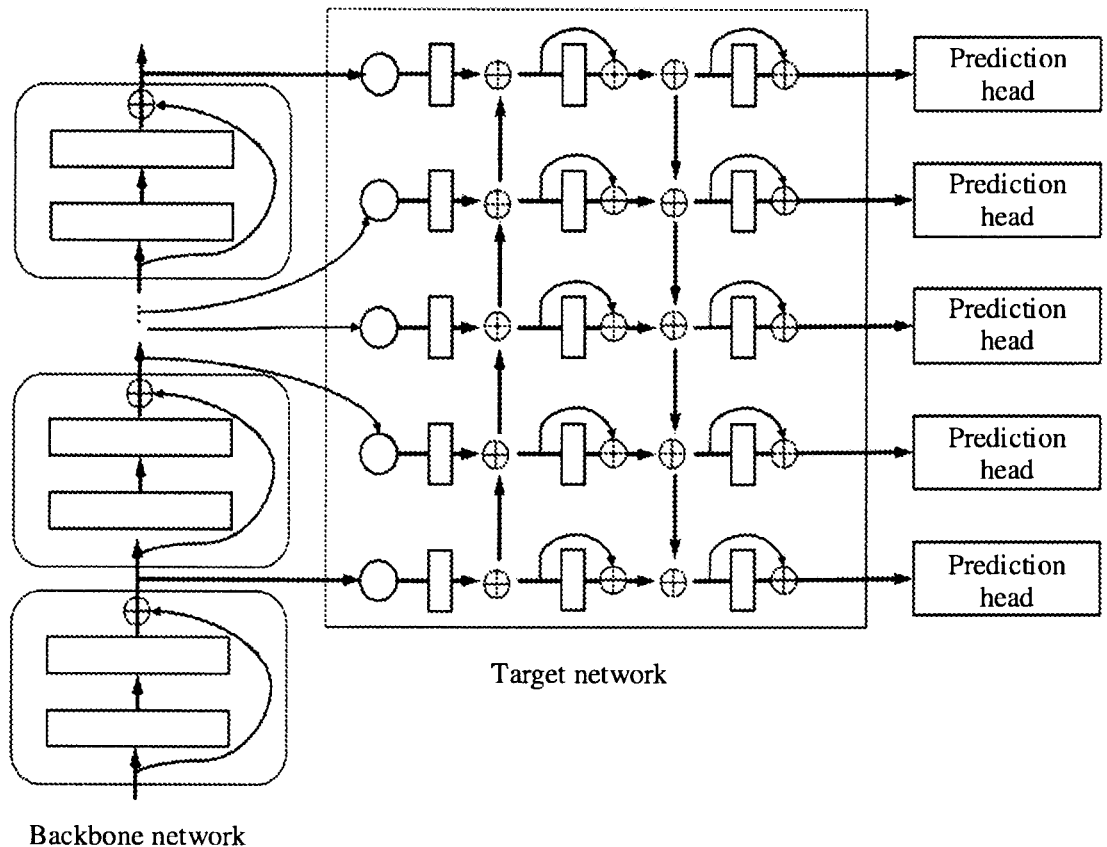
FIG. 12 is a schematic diagram of a structure of an object detection network according to an embodiment of this disclosure.
FIG. 13 is a schematic diagram of comparison of detection results of a network according to an embodiment of this disclosure.

For example, refer to FIG. 12. FIG. 12 is a schematic diagram of a structure of an object detection network according to an embodiment of this disclosure. As shown in FIG. 12, the object detection network includes a backbone network, a target network, and a prediction head. The backbone network is used to process an image to be processed, to obtain an input sub-feature map with decreasing resolution. Then, input sub-feature maps with different resolution are input into different branches of the target network, and multi-scale feature fusion is implemented by using the branches in the target network, to obtain a plurality of output sub-feature maps. Finally, a plurality of prediction heads separately process the plurality of obtained output sub-feature maps, to separately obtain corresponding sub-object detection results. Mutual processing is performed between sub-object detection results obtained through detection by different prediction heads, for example, deduplication processing is performed (to be specific, detected repetitive objects are removed), to obtain a final object detection result.

It may be understood that, in a training process of the object detection network, a gradient of an input (to be specific, a gradient of an output relative to the input) usually needs to be obtained, and the object detection network is optimized based on the obtained gradient when a back propagation algorithm is used, to finally obtain a trained object detection network.

In a possible embodiment, a gradient of the input feature map may be determined based on a difference between a weight of the target network and the input feature map. For example, the gradient of the input feature map may be obtained by performing a sign fetch operation on the difference between the weight of the target network and the input feature map. Simply, for any feature extraction kernel in the target network, a gradient of an input of the feature extraction kernel may be obtained by performing a sign fetch operation on a difference between a weight of the feature extraction kernel and the input of the feature extraction kernel.

Specifically, for a target network used as an adder neural network, an output Y of the feature extraction kernel in the target network is obtained through calculation between an input X of the feature extraction kernel and weight F of the feature extraction kernel. For example, a process of obtaining the output Y of the feature extraction kernel in the target network is shown in formula 1.

$$Y(m, n, t) = -\sum_{i=0}^{d}\sum_{j=0}^{d}\sum_{k=0}^{c_{in}} |X(m+i, n+j, k) - F(i, j, k, t)| \quad \text{formula 1}$$

|(•)| represents an operation for taking an absolute value, Σ (•) represents a sum operation, Y (m, n, t) is a feature map output by the feature extraction kernel, Y (m, n, t) is an element in row m, column n, and page t in the feature map output by the feature extraction kernel, X (m+i, n+j, k) is an element in row i, column j, and page k in the input feature map of the feature extraction kernel, F (i, j, k, t) is an element in row i, column j, and page k in the feature extraction kernel, t is a quantity of channels of the feature extraction kernel, d is a quantity of rows of the feature extraction kernel, and Cin is a quantity of channels of the input feature map, where d, Cin, i, j, k, m, n and t are integers.

Specifically, the gradient of the input of the feature extraction kernel may be obtained according to formula 2.

$$\frac{\partial Y}{\partial X} = \text{sign}\,(F - X) \quad \text{formula 2}$$

$$\frac{\partial Y}{\partial X}$$

is the gradient of the input of the feature extraction kernel, sign(.) represents the sign fetch operation, F is the weight of the feature extraction kernel, and X is the input of the feature extraction kernel. For the sign fetch operation represented by sign(.), when a value of F−X is negative, a value obtained after the sign fetch operation is performed is −1; and when a value of F−X is not negative, a value obtained after the sign fetch operation is performed is 1.

There are usually a plurality of branches and a plurality of loss functions in the adder neural network, for example, a regression prediction loss function that includes a detection box location and a classification loss function. Therefore, a large cumulative error may exist when a gradient obtained by using a conventional gradient calculation manner is used for network optimization. However, a more accurate gradient can be obtained by using the gradient calculation manner provided in this embodiment of this disclosure, which is conducive to improving final object detection precision.

For example, in the conventional gradient calculation manner, a HardTanh function is usually used to obtain a gradient, which is specifically shown in formula 3.

$$\frac{\partial Y}{\partial X} = HT(F - X) \qquad \text{formula 3}$$

$$\frac{\partial Y}{\partial X}$$

is the gradient of the input of the feature extraction kernel, HT(.) represents the sign fetch operation, F is the weight of the feature extraction kernel, and X is the input of the feature extraction kernel. Specifically, $$HT(x) = \begin{cases} 1 & x > 1 \\ -1 & x < 1 \\ x & -1 \le x \le 1 \end{cases}.$$

Assuming that there is a two-layer adder neural network, and an input is X. After one addition filtering is performed, X1 is obtained. Two addition filtering are separately performed on X1 to obtain Y1 and Y2. X1, Y1, and Y2 are specifically shown in formula 4.

$X_1 = -\|X - F_1\|$, $Y_1 = -\|X_1 - F_2\|$, $Y_2 = -\|X_1 - F_3\|$, formula 4

Assuming that losses obtained through calculation for the outputs Y1 and Y2 are L1 and L2 respectively, and a total loss is L=L1+L2. In this case, a gradient of L to F1 is specifically shown in formula 5.

$$\frac{\partial L}{\partial F_1} = \frac{\partial L}{\partial X_1}\frac{\partial X_1}{\partial F_1} = \left(\frac{\partial L_1}{\partial Y_1}\frac{\partial Y_1}{\partial X_1} + \frac{\partial L_2}{\partial Y_2}\frac{\partial Y_2}{\partial X_1}\right)\frac{\partial X_1}{\partial F_1}. \qquad \text{formula 5}$$

If a gradient is calculated in the conventional gradient calculation manner, a gradient of F1 is specifically shown in formula 6.

$$\left(\frac{\partial L_1}{\partial Y_1}HT(X_1 - F_2) + \frac{\partial L_2}{\partial Y_2}HT(X_1 - F_3)\right)\frac{\partial X_1}{\partial F_1}, \qquad \text{formula 6}$$

However, it can be learned, with reference to formula 5, that an actual gradient of F1 is shown in formula 7.

$$\left(\frac{\partial L_1}{\partial Y_1}\text{sgn}(X_1 - F_2) + \frac{\partial L_2}{\partial Y_2}\text{sgn}(X_1 - F_3)\right)\frac{\partial X_1}{\partial F_1}. \qquad \text{formula 7}$$

In this case, there is a large error between the gradient obtained by using the conventional gradient calculation manner and the actual gradient, which is prone to affect the final object detection precision.

To verify beneficial effects of the image processing method provided in this embodiment of this disclosure, the image processing method is verified on a standard COCO dataset in this embodiment of this disclosure.

Refer to FIG. 13. FIG. 13 is a schematic diagram of comparison of detection results of a network according to an embodiment of this disclosure. As shown in FIG. 13, according to a gradient calculation manner (L1 Gradients) for an adder neural network provided in this embodiment, 0.4 mean average precision (mean average precision, mAP) can be improved. The mAP is a precision measurement indicator in an object detection field.

Figures 14, 15:
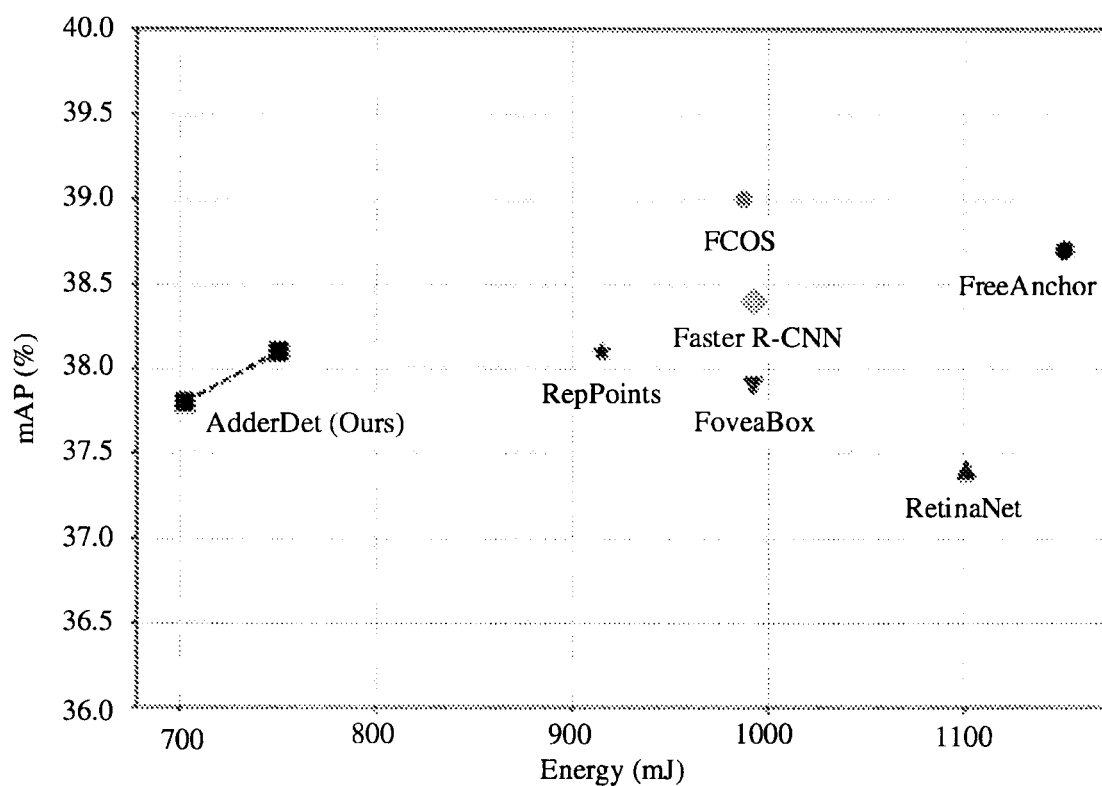
FIG. 14 is another schematic diagram of comparison of detection results of a network according to an embodiment of this disclosure.
FIG. 15 is a schematic diagram of comparison of theoretical power consumption of a network according to an embodiment of this disclosure.

Refer to FIG. 14. FIG. 14 is another schematic diagram of comparison of detection results of a network according to an embodiment of this disclosure. As shown in FIG. 14, compared with structures of conventional feature fusion networks (FPN and PAFPN), according to a target network (R-PAFPN) provided in this embodiment, 1.6 to 1.7 mAP can be improved.

Refer to FIG. 15. FIG. 15 is a schematic diagram of comparison of theoretical power consumption of a network according to an embodiment of this disclosure. As shown in FIG. 15, an object detection network (AdderDet) that includes the foregoing target network provided in this embodiment can achieve 37.8 mAP on a COCO dataset. Compared with a standard multiplication convolutional neural network structure (FCOS), there is a gap of only 1.2 mAP. However, a multiplication calculation amount is greatly reduced, and therefore, theoretical power consumption can be greatly reduced.

Figure 16:
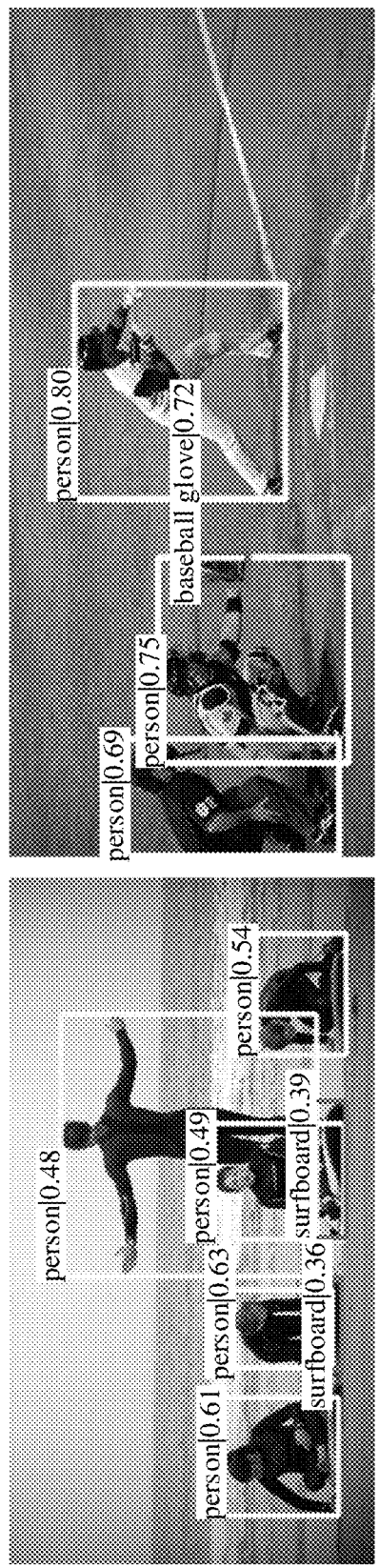
FIG. 16 is a schematic diagram in which object detection is performed on an image according to an embodiment of this disclosure.

Refer to FIG. 16. FIG. 16 is a schematic diagram in which object detection is performed on an image according to an embodiment of this disclosure. As shown in FIG. 16, according to the image processing method provided in this embodiment, a good detection result can be obtained.

Figure 17:
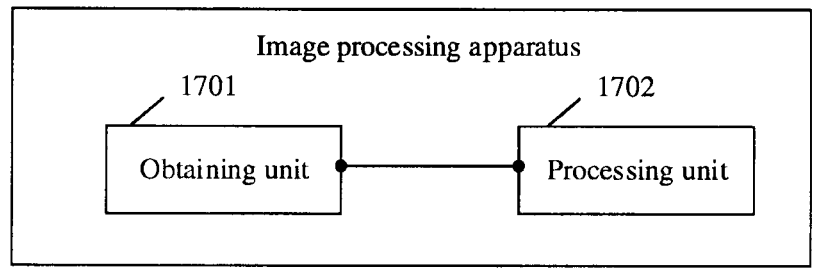
FIG. 17 is a schematic diagram of a structure of an image processing apparatus according to an embodiment of this disclosure.

Refer to FIG. 17. FIG. 17 is a schematic diagram of a structure of an image processing apparatus according to an embodiment of this disclosure. As shown in FIG. 17, the image processing apparatus provided in this embodiment of this disclosure includes: an obtaining unit 1701 and a processing unit 1702. The obtaining unit 1701 is configured to obtain an input feature map of an image to be processed, where the input feature map includes a first input sub-feature map and a second input sub-feature map, and resolution of the first input sub-feature map is higher than resolution of the second input sub-feature map. The processing unit 1702 is configured to perform feature fusion processing on the input feature map by using a target network, to obtain an output feature map, where the target network is an adder neural network, the target network includes a first branch and a second branch, the first branch is configured to perform feature extraction processing on the first input sub-feature map, to obtain a first sub-feature map and a first output sub-feature map, the first sub-feature map is an intermediate feature obtained by the first branch, the second branch is configured to perform feature extraction processing on the second input sub-feature map and the first sub-feature map, to obtain a second output sub-feature map, and the output feature map includes the first output sub-feature map and the second output sub-feature map. The processing unit 1702 is further configured to perform, based on the output feature map, object detection on the image to be processed to obtain an object detection result.

Optionally, in a possible implementation, that the second branch is configured to perform feature extraction processing on the second input sub-feature map and the first sub-feature map, to obtain a second output sub-feature map includes: the second branch is configured to: add the second input sub-feature map and the first sub-feature map that is obtained after down-sampling processing is performed, to obtain a second sub-feature map, and perform feature extraction processing on the second sub-feature map, to obtain the second output sub-feature map.

Optionally, in a possible implementation, that the second branch performs feature extraction processing on the second sub-feature map includes: the second branch processes the second sub-feature map by using a convolutional layer and an activation function, to obtain a third sub-feature map; and the second branch adds the second sub-feature map and the third sub-feature map, to obtain the second output sub-feature map.

Optionally, in a possible implementation, the second branch is further configured to perform feature extraction processing on the second sub-feature map, to obtain a fourth sub-feature map. The fourth sub-feature map is an intermediate feature obtained by the second branch. That the first branch performs feature extraction processing on the first input sub-feature map includes: the first branch performs feature extraction processing on the first sub-feature map, to obtain the first sub-feature map; the first branch adds the first sub-feature map and the fourth sub-feature map that is obtained after up-sampling processing is performed, to obtain a fifth sub-feature map; and the first branch performs feature extraction processing on the fifth feature map, to obtain the first output sub-feature map.

Optionally, in a possible implementation, that the first branch performs feature extraction processing on the fifth feature map, to obtain the first output sub-feature map includes: the first branch processes the fifth sub-feature map by using a convolutional layer and an activation function, to obtain a sixth sub-feature map; and the first branch adds the fifth sub-feature map and the sixth sub-feature map, to obtain the first output sub-feature map.

Optionally, in a possible implementation, a gradient of the input feature map is determined based on a difference between a weight of the target network and the input feature map.

Optionally, in a possible implementation, the gradient of the input feature map is obtained by performing a sign fetch operation on the difference between the weight of the target network and the input feature map.

Figure 18:
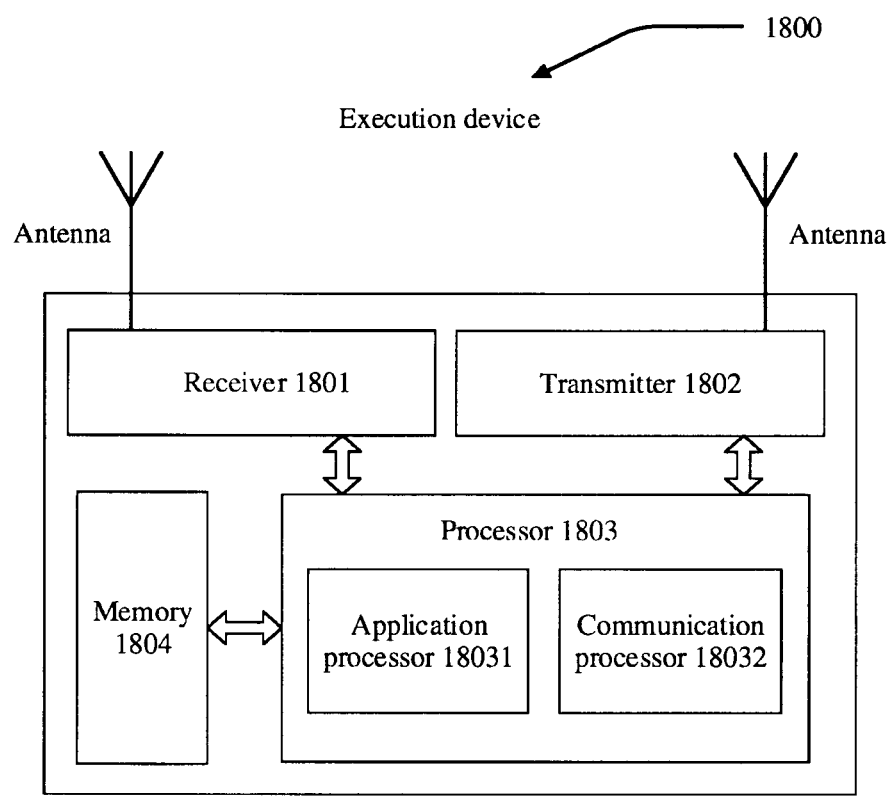
FIG. 18 is a schematic diagram of a structure of an execution device according to an embodiment of this disclosure.

The following describes an execution device provided in an embodiment of this disclosure. Refer to FIG. 18. FIG. 18 is a schematic diagram of a structure of an execution device according to an embodiment of this disclosure. An execution device 1800 may be specifically a mobile phone, a tablet computer, a laptop computer, a smart wearable device, a server, and the like, which is not limited herein. The execution device 1800 may be provided with the data processing apparatus in the embodiment corresponding to FIG. 18, to implement the data processing functions in the embodiment corresponding FIG. 18. Specifically, the execution device 1800 includes a receiver 1801, a transmitter 1802, a processor 1803, and a memory 1804 (there may be one or more processors 1803 in the execution device 1800, and one processor is used as an example in FIG. 18). The processor 1803 may include an application processor 18031 and a communication processor 18032. In some embodiments of this disclosure, the receiver 1801, the transmitter 1802, the processor 1803, and the memory 1804 may be connected through a bus or in another manner.

The memory 1804 may include a read-only memory and a random access memory, and provide instructions and data for the processor 1803. A part of the memory 1804 may further include a nonvolatile random access memory (nonvolatile random access memory, NVRAM). The memory 1804 stores a processor and operation instructions, an executable module or a data structure, a subnet thereof, or an expanded set thereof. The operation instructions may include various operation instructions, to implement various operations.

The processor 1803 controls an operation of the execution device. During specific application, the components of the execution device are coupled together through a bus system. In addition to a data bus, the bus system may further include a power bus, a control bus, a status signal bus, and the like. However, for clear description, various types of buses in the figure are referred to as the bus system.

The method disclosed in embodiments of this disclosure may be applied to the processor 1803, or may be implemented by the processor 1803. The processor 1803 may be an integrated circuit chip, and has a signal processing capability. In an implementation process, steps in the methods may be implemented by using a hardware integrated logic circuit in the processor 1803, or by using instructions in a form of software. The processor 1803 may be a general-purpose processor, a digital signal processor (DSP), a microprocessor, or a microcontroller. The processor 1803 may further include an application-specific integrated circuit (ASIC), a field programmable gate array (FPGA) or another programmable logic device, a discrete gate, a transistor logic device, or a discrete hardware component. The processor 1803 may implement or perform the method, the steps, and the logical block diagrams disclosed in embodiments of this disclosure. The general-purpose processor may be a microprocessor, or the processor may be any conventional processor, or the like. The steps in the methods disclosed with reference to embodiments of this disclosure may be directly performed and completed by a hardware decoding processor, or may be performed and completed by a combination of hardware and a software module in the decoding processor. The software module may be located in a mature storage medium in the art such as a random access memory, a flash memory, a read-only memory, a programmable read-only memory, an electrically erasable programmable memory, or a register. The storage medium is located in the memory 1804, and the processor 1803 reads information in the memory 1804 and completes the steps in the foregoing methods in combination with hardware of the processor 1803.

The receiver 1801 may be configured to receive input digit or character information, and generate a signal input related to related setting and function control of the execution device. The transmitter 1802 may be configured to output the digital or character information through a first interface. The transmitter 1802 may further be configured to send instructions to a disk group through the first interface, to modify data in the disk group. The transmitter 1802 may further include a display device such as a display.

In this embodiment of this disclosure, in one case, the processor 1803 is configured to perform the image processing method performed by the execution device in an embodiment corresponding to FIG. 7.

An embodiment of this disclosure further provides a computer program product. When the computer program product is run on a computer, the computer is enabled to perform steps performed by the execution device or steps performed by the training device.

An embodiment of this disclosure further provides a computer-readable storage medium. The computer-readable storage medium stores a program used for signal processing.

When the program is run on a computer, the computer is enabled to perform steps performed by the execution device or steps performed by the training device.

The execution device, the training device, or the terminal device in embodiments of this disclosure may be specifically a chip. The chip includes a processing unit and a communication unit. The processing unit may be, for example, a processor, and the communication unit may be, for example, an input/output interface, a pin, or a circuit. The processing unit may execute computer-executable instructions stored in a storage unit, so that a chip in the execution device performs the image processing method described in the foregoing embodiments, or a chip in the training device performs the image processing method described in the foregoing embodiments. Optionally, the storage unit is a storage unit in the chip, for example, a register or a cache. Alternatively, the storage unit may be a storage unit in a wireless access device but outside the chip, for example, a read-only memory (ROM), another type of static storage device that can store static information and instructions, or a random access memory (RAM).

Figure 19:
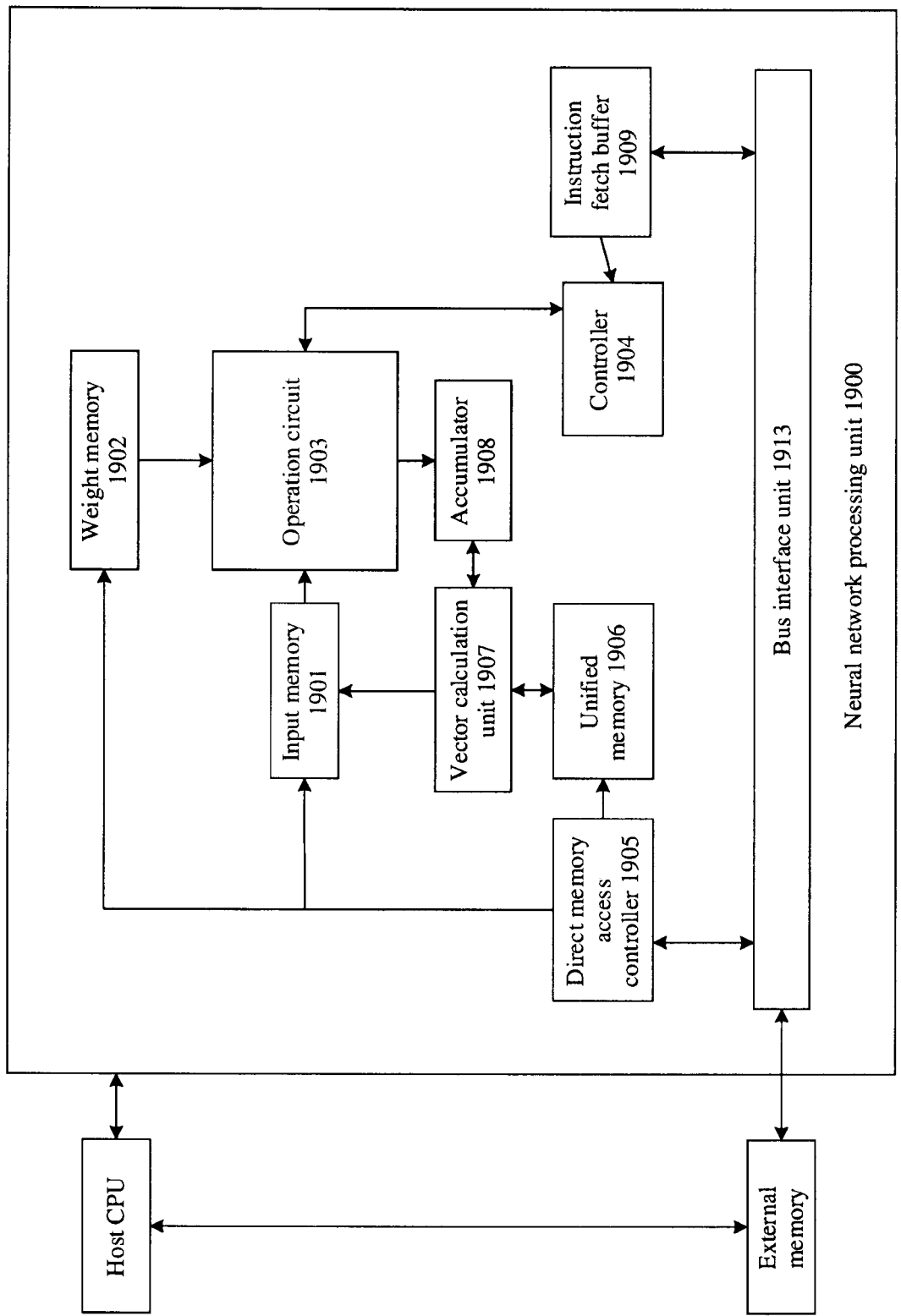
FIG. 19 is a schematic diagram of a structure of a chip according to an embodiment of this disclosure.

Specifically, refer to FIG. 19. FIG. 19 is a schematic diagram of a structure of a chip according to an embodiment of this disclosure. The chip may be represented as a neural network processing unit NPU 1900. The NPU 1900 is mounted on a host CPU as a coprocessor, and the host CPU allocates a task. A core part of the NPU is an operation circuit 1903, and a controller 1904 controls the operation circuit 1903 to extract matrix data in a memory and perform a multiplication operation.

In some implementations, the operation circuit 1903 includes a plurality of process engines (PEs) inside. In some implementations, the operation circuit 1903 is a two-dimensional systolic array. The operation circuit 1903 may alternatively be a one-dimensional systolic array or another electronic circuit that can perform mathematical operations such as multiplication and addition. In some implementations, the operation circuit 1903 is a general-purpose matrix processor.

For example, it is assumed that there is an input matrix A, a weight matrix B, and an output matrix C. The operation circuit fetches, from a weight memory 1902, data corresponding to the matrix B, and caches the data on each PE in the operation circuit. The operation circuit fetches data of the matrix A from an input memory 1901, to perform a matrix operation on the matrix B, and stores an obtained partial result or an obtained final result of the matrix in an accumulator 1908.

A unified memory 1906 is configured to store input data and output data. Weight data is directly transferred to the weight memory 1902 through a direct memory access controller (DMAC) 1905. The input data is also transferred to the unified memory 1906 by using the DMAC.

A BIU is a bus interface unit, namely, a bus interface unit 1913, and is used for interaction between an AXI bus and the DMAC and between the AXI bus and an instruction fetch buffer (IFB) 1909.

The bus interface unit (BIU for short) 1913 is used by the instruction fetch buffer 1909 to obtain an instruction from an external memory, and is further used by the direct memory access controller 1905 to obtain original data of the input matrix A or the weight matrix B from the external memory.

The DMAC is mainly configured to transfer input data in the external memory DDR to the unified memory 1906, or transfer the weight data to the weight memory 1902, or transfer the input data to the input memory 1901.

A vector calculation unit 1907 includes a plurality of operation processing units; and if necessary, performs further processing such as vector multiplication, vector addition, an exponential operation, a logarithmic operation, or value comparison on an output of the operation circuit 1903. The vector calculation unit 1907 is mainly configured to perform network calculation, such as batch normalization, pixel-level summation, and up-sampling on a feature plane, at a non-convolutional/fully connected layer in a neural network.

In some implementations, the vector calculation unit 1907 can store a processed output vector in the unified memory 1906. For example, the vector calculation unit 1907 may apply a linear function or a nonlinear function to the output of the operation circuit 1903, for example, perform linear interpolation on a feature plane extracted at a convolutional layer. For another example, the vector calculation unit 1907 may apply a linear function or a nonlinear function to a vector of an accumulated value, to generate an activation value. In some implementations, the vector calculation unit 1907 generates a normalized value, a pixel-level sum, or a normalized value and a pixel-level sum. In some implementations, the processed output vector can be used as an activation input into the operation circuit 1903, for example, to be used at a subsequent layer of the neural network.

The instruction fetch buffer 1909 connected to the controller 1904 is configured to store instructions used by the controller 1904.

The unified memory 1906, the input memory 1901, the weight memory 1902, and the instruction fetch buffer 1909 are all on-chip memories. The external memory is private for a hardware architecture of the NPU.

The processor mentioned above may be a general-purpose central processing unit, a microprocessor, an ASIC, or one or more integrated circuits for controlling program execution.

In addition, it should be noted that the apparatus embodiments described above are merely an example. The units described as separate parts may or may not be physically separate, and parts displayed as units may or may not be physical units, may be located in one place, or may be distributed on a plurality of network units. Some or all of the modules may be selected based on an actual requirement, to achieve objectives of the solutions in embodiments. In addition, in the accompanying drawings of the apparatus embodiments provided in this disclosure, a connection relationship between modules indicates that the modules have a communication connection with each other, and may be specifically implemented as one or more communication buses or signal cables.

Based on the description of the foregoing implementations, a person skilled in the art may clearly understand that this disclosure may be implemented by software in addition to necessary universal hardware, or by dedicated hardware, including a dedicated integrated circuit, a dedicated CPU, a dedicated memory, a dedicated component, and the like. Usually, any function implemented by a computer program may be easily implemented by using corresponding hardware. In addition, specific hardware structures used to implement a same function may be various, for example, an analog circuit, a digital circuit, or a dedicated circuit. However, in this disclosure, a software program implementation is a better implementation in most cases. Based on such an understanding, the technical solutions of this disclosure essentially or the part contributing to the conventional technology may be implemented in a form of a software product. The computer software product is stored in a readable storage medium, such as a floppy disk, a USB flash drive, a removable hard disk, a ROM, a RAM, a magnetic disk, or an optical disc of a computer, and includes several instructions for instructing a computer device (which may be a personal computer, a training device, or a network device) to perform the methods in embodiments of this disclosure.

All or some of the foregoing embodiments may be implemented by using software, hardware, firmware, or any combination thereof. When software is used to implement the embodiments, all or some of the embodiments may be implemented in a form of a computer program product.

The computer program product includes one or more computer instructions. When the computer program instructions are loaded and executed on a computer, all or some procedures or functions in embodiments of this disclosure are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, training device, or data center to another website, computer, training device, or data center in a wired (for example, a coaxial cable, an optical fiber, or a digital subscriber line (DSL)) or wireless (for example, infrared, radio, or microwave) manner. The computer-readable storage medium may be any usable medium that can be stored by the computer, or a data storage device, for example, a training device or a data center in which one or more usable media are integrated. The usable medium may be a magnetic medium (for example, a floppy disk, a hard disk, or a magnetic tape), an optical medium (for example, a DVD), a semiconductor medium (for example, a solid state disk (SSD)), or the like.

What is claimed is:

1. An image processing method, comprising:
    obtaining an input feature map of an image to be processed, wherein the input feature map comprises a first input sub-feature map and a second input sub-feature map, and resolution of the first input sub-feature map is higher than resolution of the second input sub-feature map;
    performing feature fusion processing on the input feature map by using a target network, to obtain an output feature map, wherein the target network is an adder neural network, the target network comprises a first branch and a second branch, the first branch is configured to perform feature extraction processing on the first input sub-feature map, to obtain a first sub-feature map and a first output sub-feature map, the first sub-feature map is an intermediate feature obtained by the first branch, the second branch is configured to perform feature extraction processing on the second input sub-feature map and the first sub-feature map, to obtain a second output sub-feature map, and the output feature map comprises the first output sub-feature map and the second output sub-feature map; and
    performing, based on the output feature map, object detection on the image to be processed, to obtain an object detection result.

2. The method according to claim 1, wherein that the second branch is configured to perform feature extraction processing on the second input sub-feature map and the first sub-feature map, to obtain a second output sub-feature map comprises:
    adding, by the second branch, the second input sub-feature map and the first sub-feature map that is obtained after down-sampling processing is performed, to obtain a second sub-feature map, and performing, by the second branch, feature extraction processing on the second sub-feature map, to obtain the second output sub-feature map.

3. The method according to claim 2, wherein the performing, by the second branch, feature extraction processing on the second sub-feature map comprises:
    processing, by the second branch, the second sub-feature map by using a convolutional layer and an activation function, to obtain a third sub-feature map; and
    adding, by the second branch, the second sub-feature map and the third sub-feature map, to obtain the second output sub-feature map.

4. The method according to claim 2, wherein the second branch is further configured to perform feature extraction processing on the second sub-feature map, to obtain a fourth sub-feature map, and the fourth sub-feature map is an intermediate feature obtained by the second branch; and
    that the first branch performs feature extraction processing on the first input sub-feature map comprises:
    performing, by the first branch, feature extraction processing on the first input sub-feature map, to obtain the first sub-feature map;
    adding, by the first branch, the first sub-feature map and the fourth sub-feature map that is obtained after up-sampling processing is performed, to obtain a fifth sub-feature map; and
    performing, by the first branch, feature extraction processing on the fifth sub-feature map, to obtain the first output sub-feature map.

5. The method according to claim 4, wherein the performing, by the first branch, feature extraction processing on the fifth sub-feature map, to obtain the first output sub-feature map comprises:
    processing, by the first branch, the fifth sub-feature map by using a convolutional layer and an activation function, to obtain a sixth sub-feature map; and
    adding, by the first branch, the fifth sub-feature map and the sixth sub-feature map, to obtain the first output sub-feature map.

6. The method according to claim 1, wherein a gradient of the input feature map is determined by a difference between a weight of the target network and the input feature map.

7. The method according to claim 6, wherein the gradient of the input feature map is obtained by performing a sign fetch operation on the difference between the weight of the target network and the input feature map.

8. An image processing apparatus, comprising a memory and a processor, wherein the memory stores code, the processor is configured to execute the code, and when the code is executed, the image processing apparatus performs operations comprising:
    obtaining an input feature map of an image to be processed, wherein the input feature map comprises a first input sub-feature map and a second input sub-feature map, and resolution of the first input sub-feature map is higher than resolution of the second input sub-feature map;
    performing feature fusion processing on the input feature map by using a target network, to obtain an output feature map, wherein the target network is an adder neural network, the target network comprises a first branch and a second branch, the first branch is configured to perform feature extraction processing on the first input sub-feature map, to obtain a first sub-feature map and a first output sub-feature map, the first sub-feature map is an intermediate feature obtained by the first branch, the second branch is configured to perform feature extraction processing on the second input sub-feature map and the first sub-feature map, to obtain a second output sub-feature map, and the output feature map comprises the first output sub-feature map and the second output sub-feature map; and performing, based on the output feature map, object detection on the image to be processed, to obtain an object detection result.

9. The image processing apparatus according to claim 8, wherein that the second branch is configured to perform feature extraction processing on the second input sub-feature map and the first sub-feature map, to obtain a second output sub-feature map comprises:

adding, by the second branch, the second input sub-feature map and the first sub-feature map that is obtained after down-sampling processing is performed, to obtain a second sub-feature map, and performing, by the second branch, feature extraction processing on the second sub-feature map, to obtain the second output sub-feature map.

10. The image processing apparatus according to claim 9, wherein the performing, by the second branch, feature extraction processing on the second sub-feature map comprises:

processing, by the second branch, the second sub-feature map by using a convolutional layer and an activation function, to obtain a third sub-feature map; and adding, by the second branch, the second sub-feature map and the third sub-feature map, to obtain the second output sub-feature map.

11. The image processing apparatus according to claim 9, wherein the second branch is further configured to perform feature extraction processing on the second sub-feature map, to obtain a fourth sub-feature map, and the fourth sub-feature map is an intermediate feature obtained by the second branch; and that the first branch performs feature extraction processing on the first input sub-feature map comprises:

performing, by the first branch, feature extraction processing on the first input sub-feature map, to obtain the first sub-feature map;

adding, by the first branch, the first sub-feature map and the fourth sub-feature map that is obtained after up-sampling processing is performed, to obtain a fifth sub-feature map; and performing, by the first branch, feature extraction processing on the fifth sub-feature map, to obtain the first output sub-feature map.

12. The image processing apparatus according to claim 11, wherein the performing, by the first branch, feature extraction processing on the fifth feature map, to obtain the first output sub-feature map comprises:

processing, by the first branch, the fifth sub-feature map by using a convolutional layer and an activation function, to obtain a sixth sub-feature map; and adding, by the first branch, the fifth sub-feature map and the sixth sub-feature map, to obtain the first output sub-feature map.

13. The image processing apparatus according to claim 8, wherein a gradient of the input feature map is determined by a difference between a weight of the target network and the input feature map.

14. The image processing apparatus according to claim 13, wherein the gradient of the input feature map is obtained by performing a sign fetch operation on the difference between the weight of the target network and the input feature map.

15. A non-transitory computer storage medium, wherein the computer storage medium stores instructions, and when the instructions are executed by a computer, the computer is enabled to perform the operations comprising:

obtaining an input feature map of an image to be processed, wherein the input feature map comprises a first input sub-feature map and a second input sub-feature map, and resolution of the first input sub-feature map is higher than resolution of the second input sub-feature map;

performing feature fusion processing on the input feature map by using a target network, to obtain an output feature map, wherein the target network is an adder neural network, the target network comprises a first branch and a second branch, the first branch is configured to perform feature extraction processing on the first input sub-feature map, to obtain a first sub-feature map and a first output sub-feature map, the first sub-feature map is an intermediate feature obtained by the first branch, the second branch is configured to perform feature extraction processing on the second input sub-feature map and the first sub-feature map, to obtain a second output sub-feature map, and the output feature map comprises the first output sub-feature map and the second output sub-feature map; and performing, based on the output feature map, object detection on the image to be processed, to obtain an object detection result.

16. The non-transitory computer storage medium according to claim 15, wherein that the second branch is configured to perform feature extraction processing on the second input sub-feature map and the first sub-feature map, to obtain a second output sub-feature map comprises:

adding, by the second branch, the second input sub-feature map and the first sub-feature map that is obtained after down-sampling processing is performed, to obtain a second sub-feature map, and performing, by the second branch, feature extraction processing on the second sub-feature map, to obtain the second output sub-feature map.

17. The non-transitory computer storage medium according to claim 16, wherein the performing, by the second branch, feature extraction processing on the second sub-feature map comprises:

processing, by the second branch, the second sub-feature map by using a convolutional layer and an activation function, to obtain a third sub-feature map; and adding, by the second branch, the second sub-feature map and the third sub-feature map, to obtain the second output sub-feature map.

18. The non-transitory computer storage medium according to claim 16, wherein the second branch is further configured to perform feature extraction processing on the second sub-feature map, to obtain a fourth sub-feature map, and the fourth sub-feature map is an intermediate feature obtained by the second branch; and that the first branch performs feature extraction processing on the first input sub-feature map comprises:

performing, by the first branch, feature extraction processing on the first input sub-feature map, to obtain the first sub-feature map;

adding, by the first branch, the first sub-feature map and the fourth sub-feature map that is obtained after up-sampling processing is performed, to obtain a fifth sub-feature map; and performing, by the first branch, feature extraction processing on the fifth sub-feature map, to obtain the first output sub-feature map.

19. The non-transitory computer storage medium according to claim 18, wherein the performing, by the first branch, feature extraction processing on the fifth feature map, to obtain the first output sub-feature map comprises:

processing, by the first branch, the fifth sub-feature map by using a convolutional layer and an activation function, to obtain a sixth sub-feature map; and adding, by the first branch, the fifth sub-feature map and the sixth sub-feature map, to obtain the first output sub-feature map.

20. The non-transitory computer storage medium according to claim 15, wherein a gradient of the input feature map is determined by a difference between a weight of the target network and the input feature map.

* * * * *